United States Patent
Dormitzer et al.

(10) Patent No.: US 10,970,246 B2
(45) Date of Patent: Apr. 6, 2021

(54) TECHNOLOGIES FOR REMOTE NETWORKED ACCELERATORS

(71) Applicant: Intel Corporation, Santa Clara, CA (US)

(72) Inventors: Paul H. Dormitzer, Acton, MA (US); Susanne M. Balle, Hudson, NH (US); Sujoy Sen, Beaverton, OR (US); Evan Custodio, Seekonk, MA (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 16/402,507

(22) Filed: May 3, 2019

(65) Prior Publication Data

US 2020/0073849 A1    Mar. 5, 2020

(51) Int. Cl.
*G06F 15/16* (2006.01)
*G06F 15/173* (2006.01)
*G06F 13/42* (2006.01)

(52) U.S. Cl.
CPC .... *G06F 15/17331* (2013.01); *G06F 13/4221* (2013.01); *G06F 13/4282* (2013.01); *G06F 2213/0024* (2013.01); *G06F 2213/0026* (2013.01)

(58) Field of Classification Search
CPC .................................................. G06F 15/17331
See application file for complete search history.

(56) References Cited

U.S. PATENT DOCUMENTS

| | | | |
|---|---|---|---|
| 10,764,189 B1* | 9/2020 | Rivaud | H04L 45/70 |
| 2014/0372657 A1* | 12/2014 | Jones | G06F 13/4027 710/313 |
| 2015/0254003 A1* | 9/2015 | Lee | G06F 12/0246 711/103 |
| 2015/0288624 A1* | 10/2015 | Raindel | G06F 13/382 709/219 |
| 2017/0109291 A1* | 4/2017 | Albot | G06F 3/0673 |
| 2018/0189225 A1* | 7/2018 | Ramaswamy | G06F 13/1631 |
| 2018/0198840 A1* | 7/2018 | Chandran | G06F 9/45533 |
| 2018/0341429 A1* | 11/2018 | Bolkhovitin | G06F 3/0659 |
| 2020/0050401 A1* | 2/2020 | Gibb | G06F 3/061 |

* cited by examiner

*Primary Examiner* — Kevin T Bates
*Assistant Examiner* — Clarence D McCray
(74) *Attorney, Agent, or Firm* — Compass IP Law, PC

(57) ABSTRACT

Technologies for network interface controllers (NICs) include a computing device having a NIC coupled to a root FPGA via an I/O link. The root FPGA is further coupled to multiple worker FPGAs by a serial link with each worker FPGA. The NIC may receive a remote direct memory access (RDMA) message from a remote host and send the RDMA message to the root FPGA via the I/O link. The root FPGA determines a target FPGA based on a memory address of the RDMA message. Each FPGA is associated with a part of a unified address space. If the target FPGA is a worker FPGA, the root FPGA sends the RDMA message to the worker FPGA via the corresponding serial link, and the worker FPGA processes the RDMA message. If the root FPGA is the target, the root FPGA may process the RDMA message. Other embodiments are described and claimed.

25 Claims, 20 Drawing Sheets

US 10,970,246 B2

TECHNOLOGIES FOR REMOTE NETWORKED ACCELERATORS

BACKGROUND

Typical computing devices include one or more network interface controllers (NICs) for transferring data over a network. Current NICs may accelerate certain network packet processing tasks. As network bandwidths increase, NICs are also process an increased volume of network traffic.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
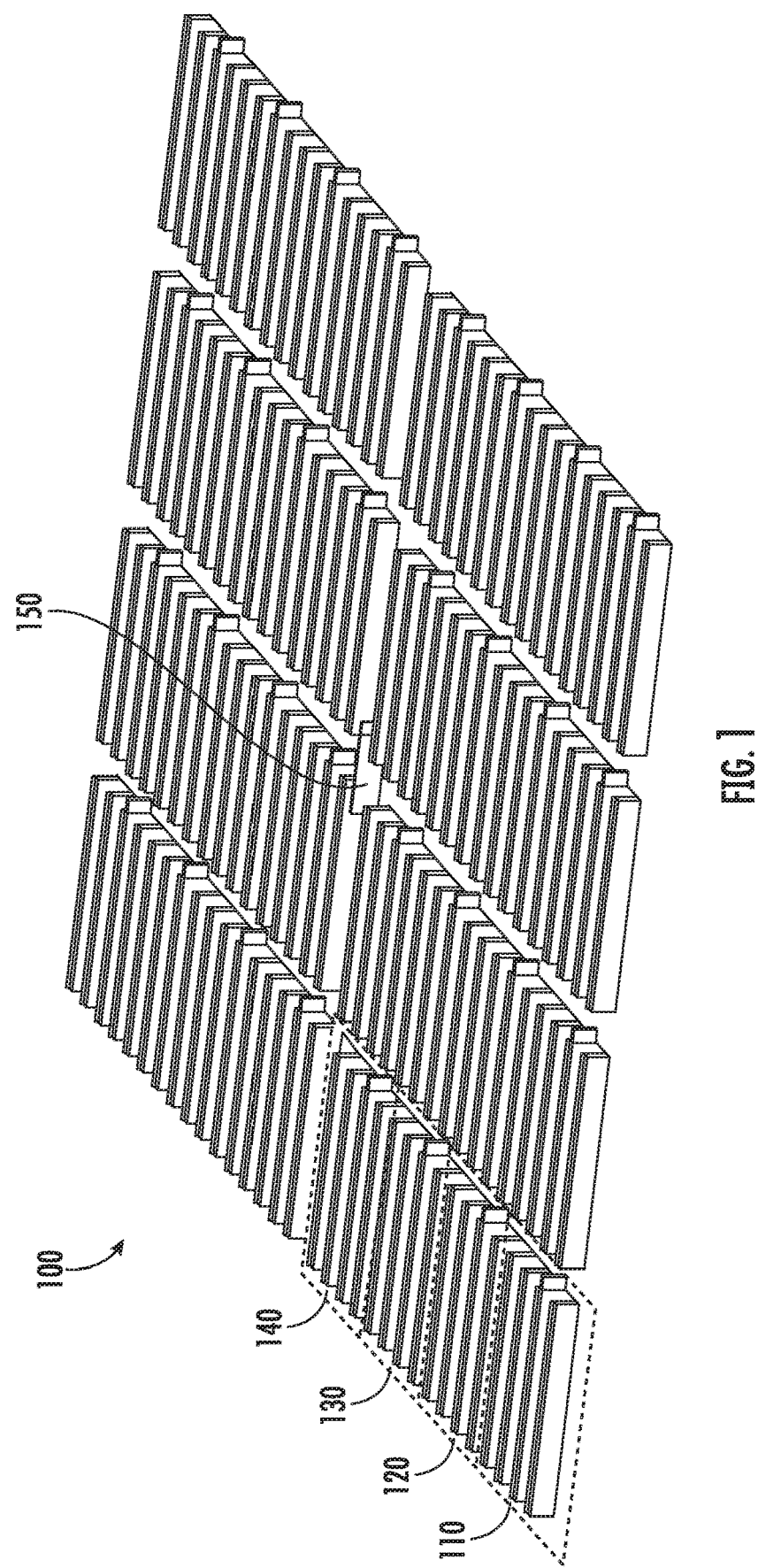
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well as in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
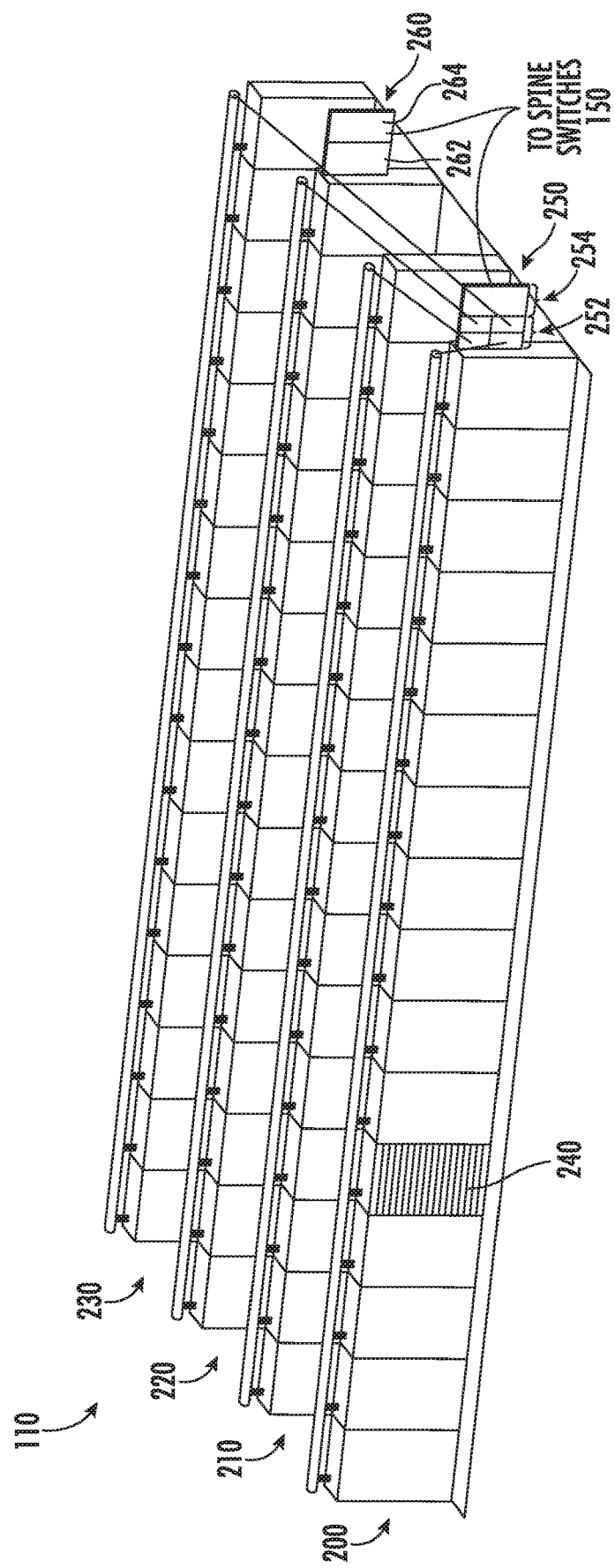
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, InfiniBand, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
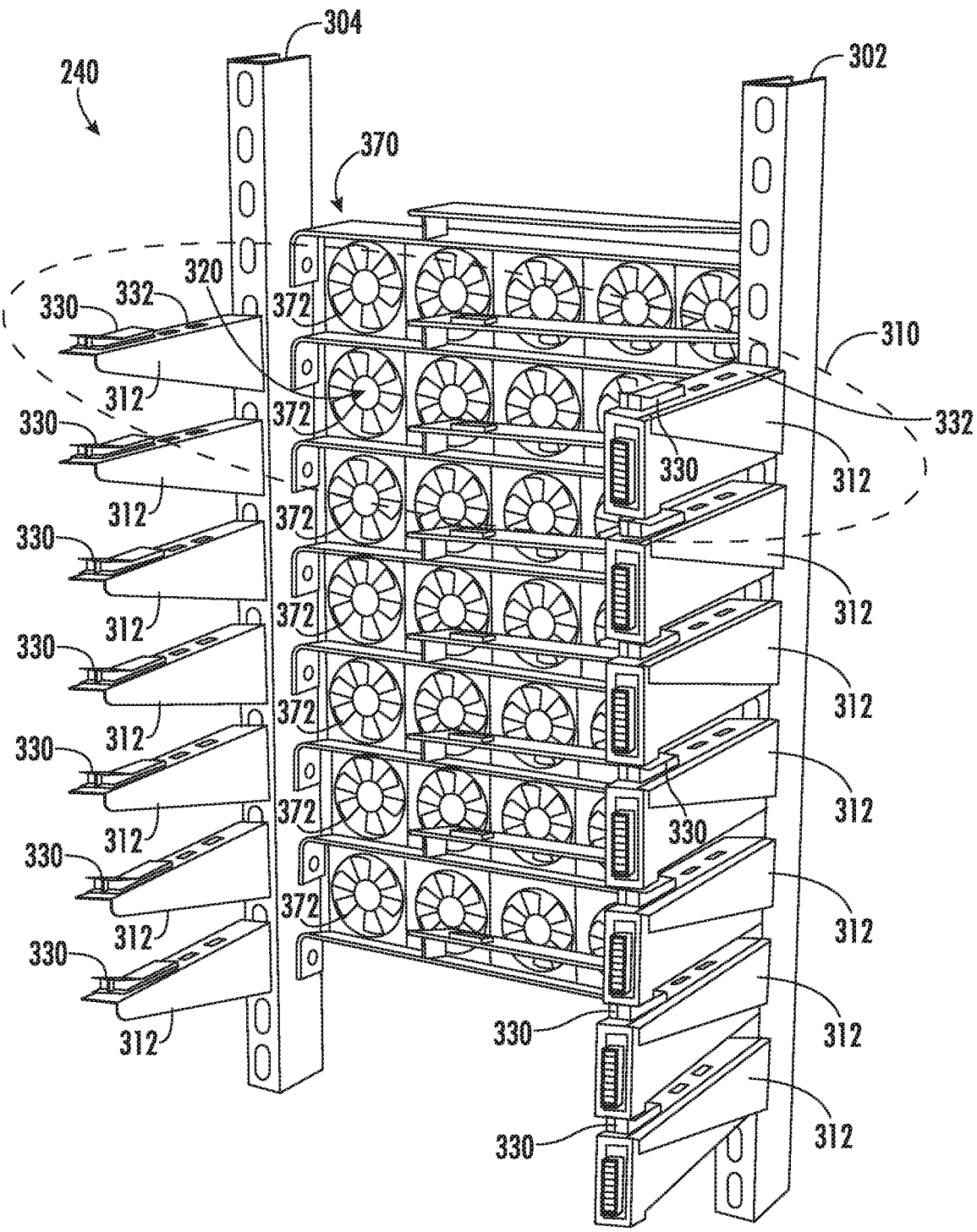
FIG. 3 is a perspective view of at least one embodiment of a rack that may be included in the pod of FIG. 2.
Figure 4:
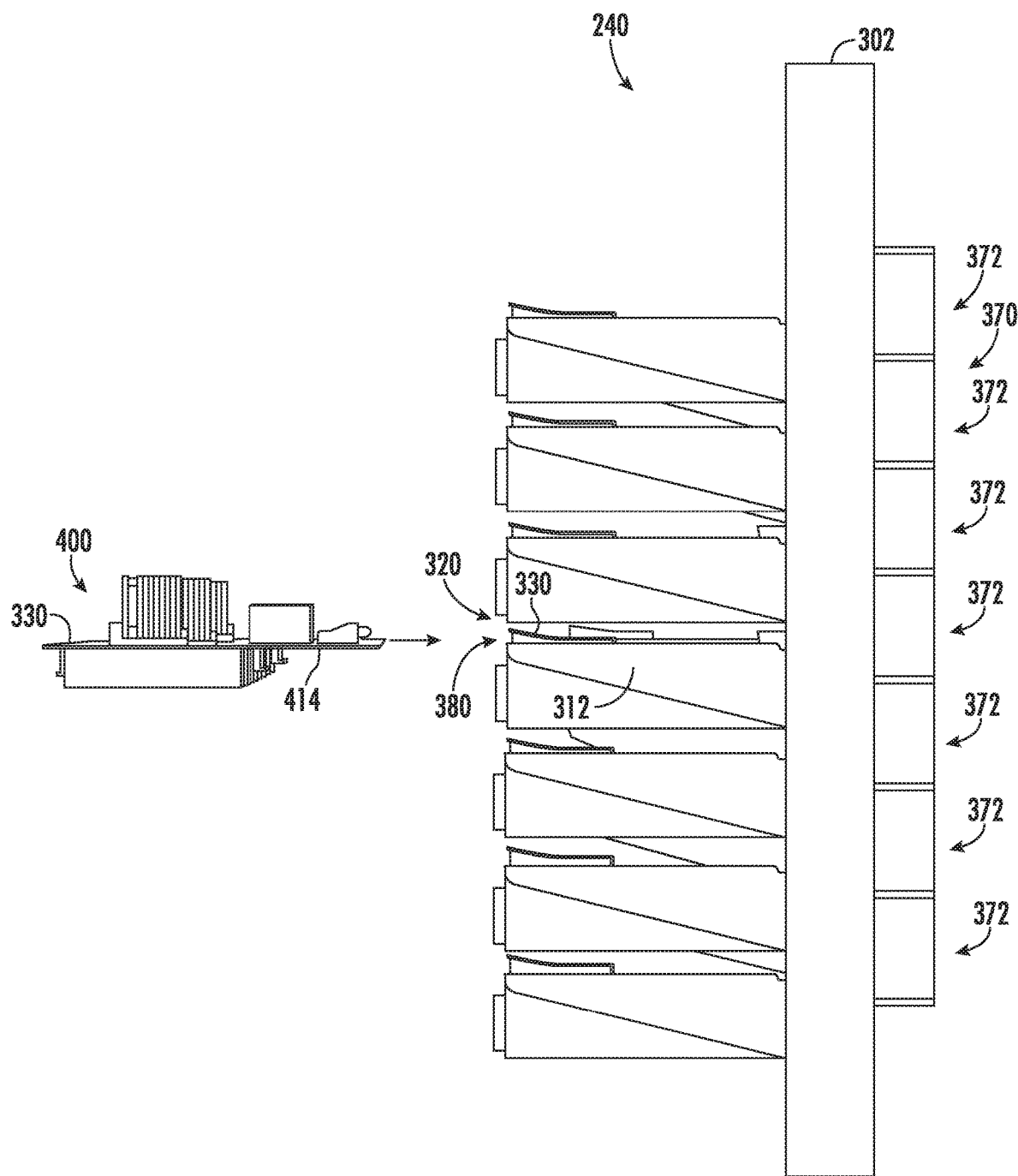
FIG. 4 is a side elevation view of the rack of FIG. 3.
Figure 5:
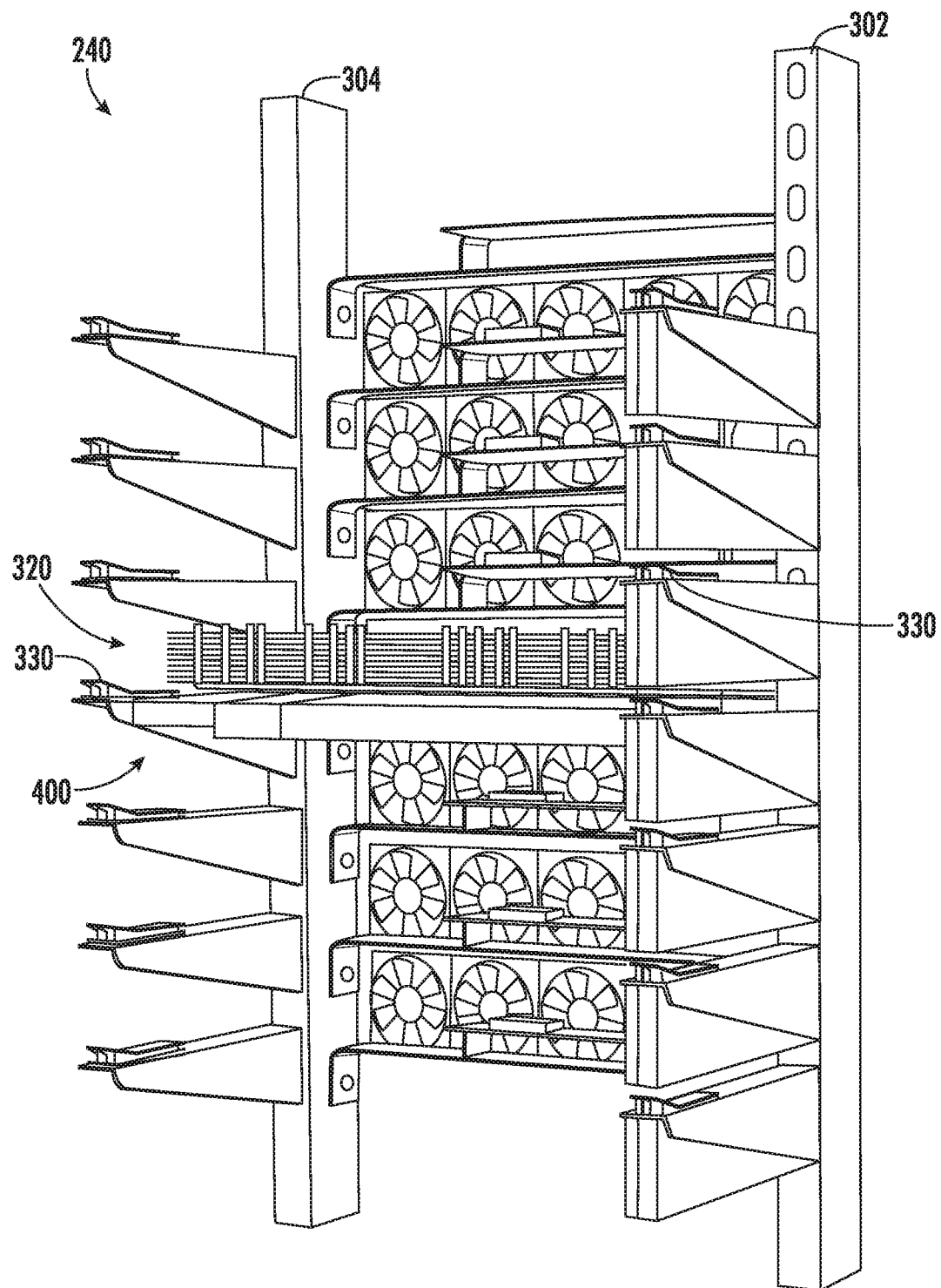
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
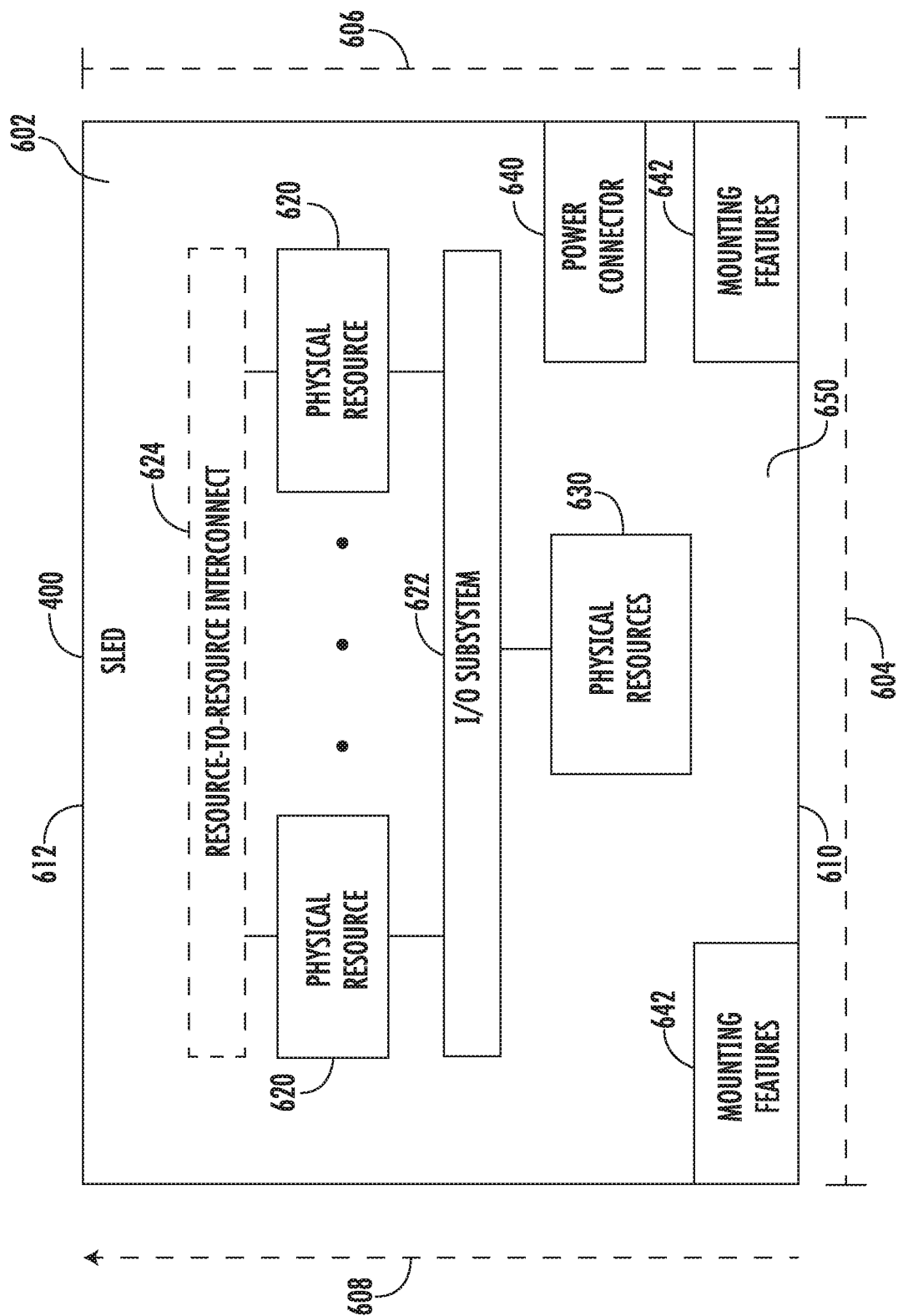
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
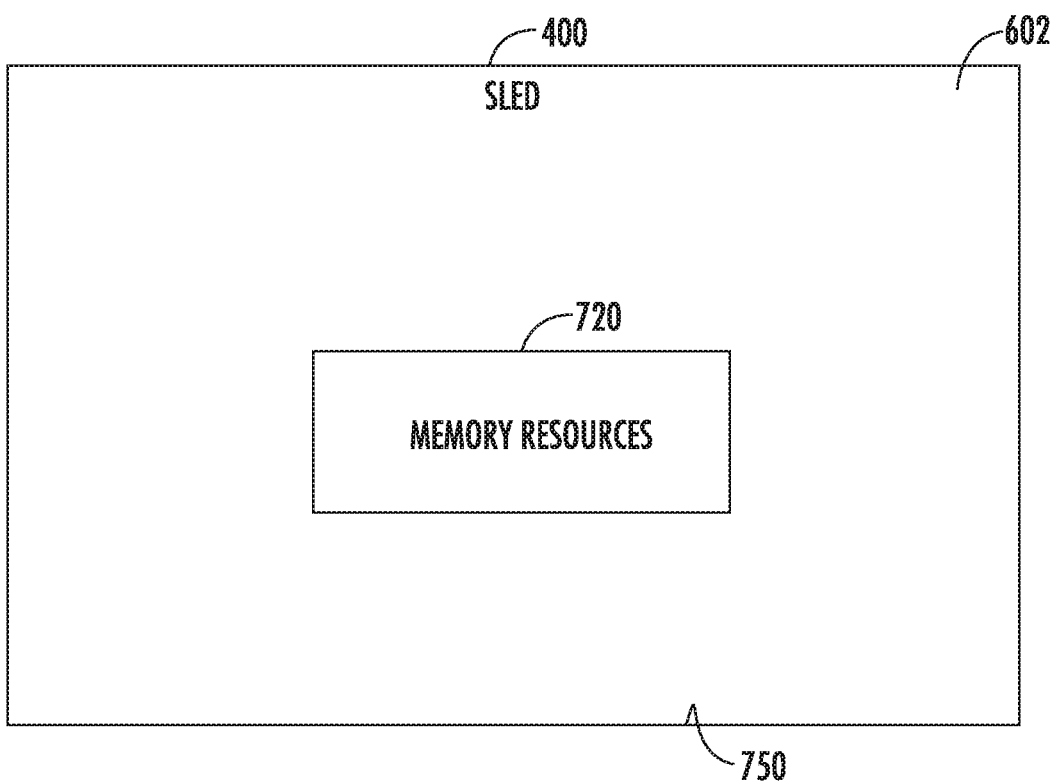
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
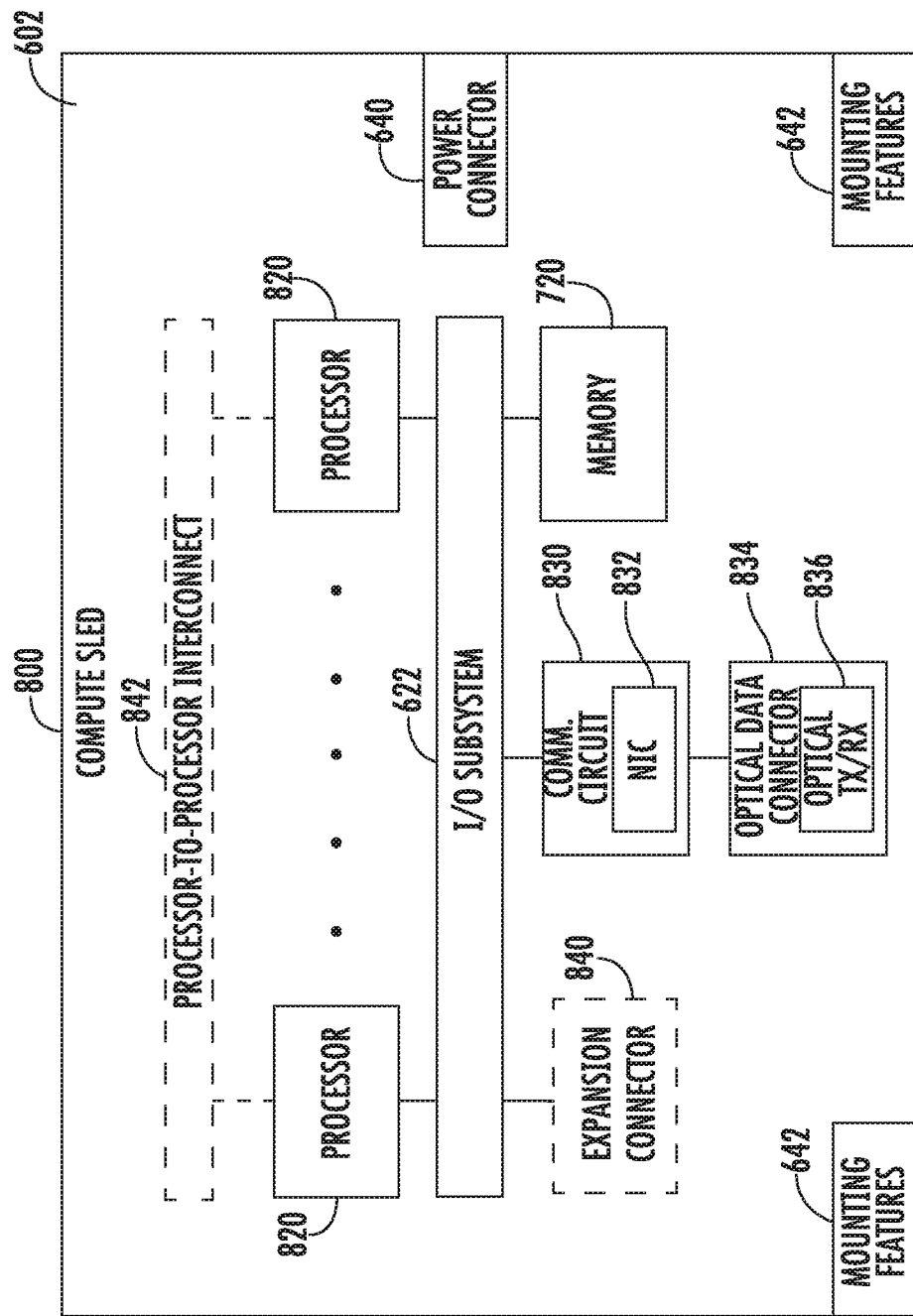
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
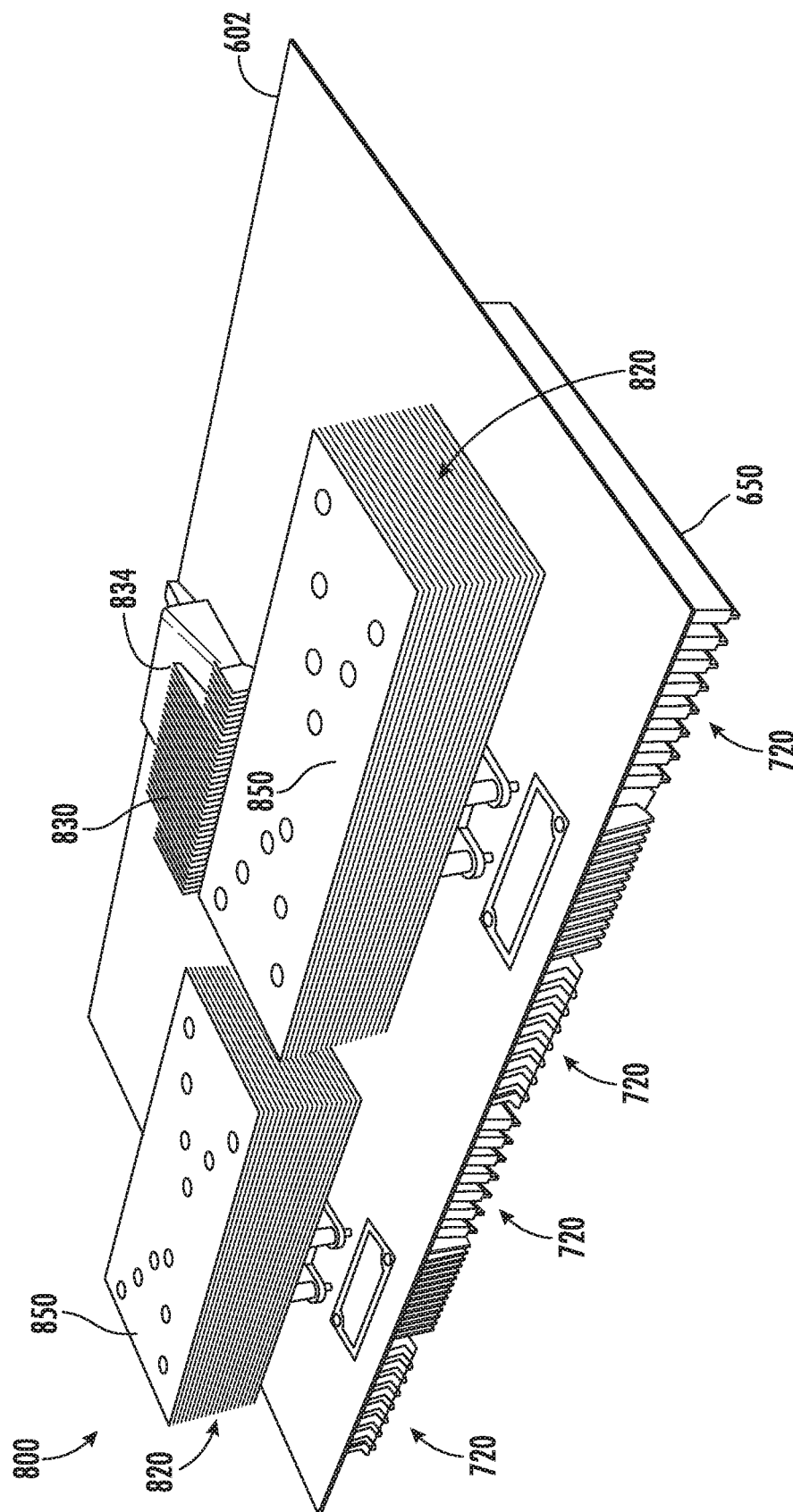
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
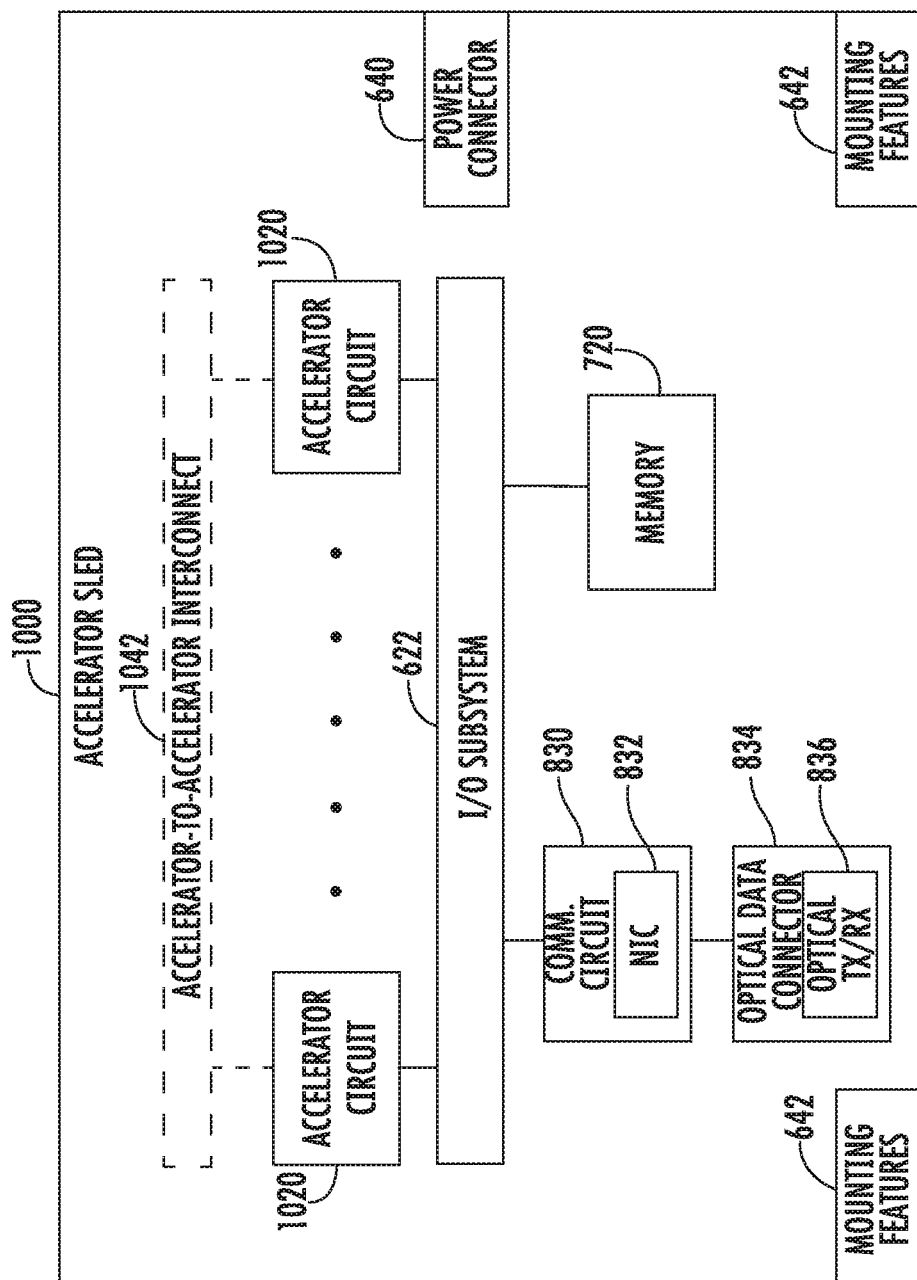
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
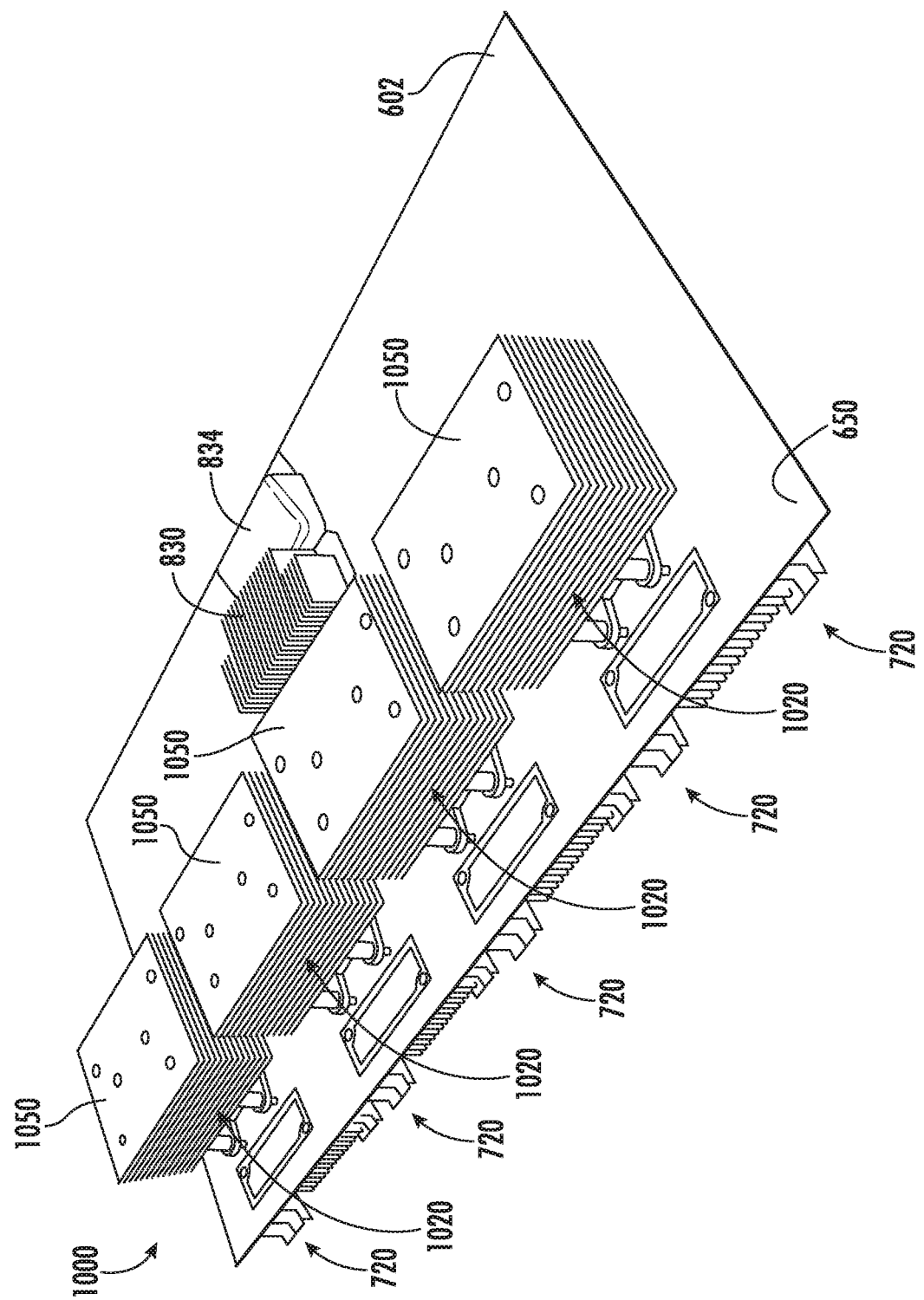
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
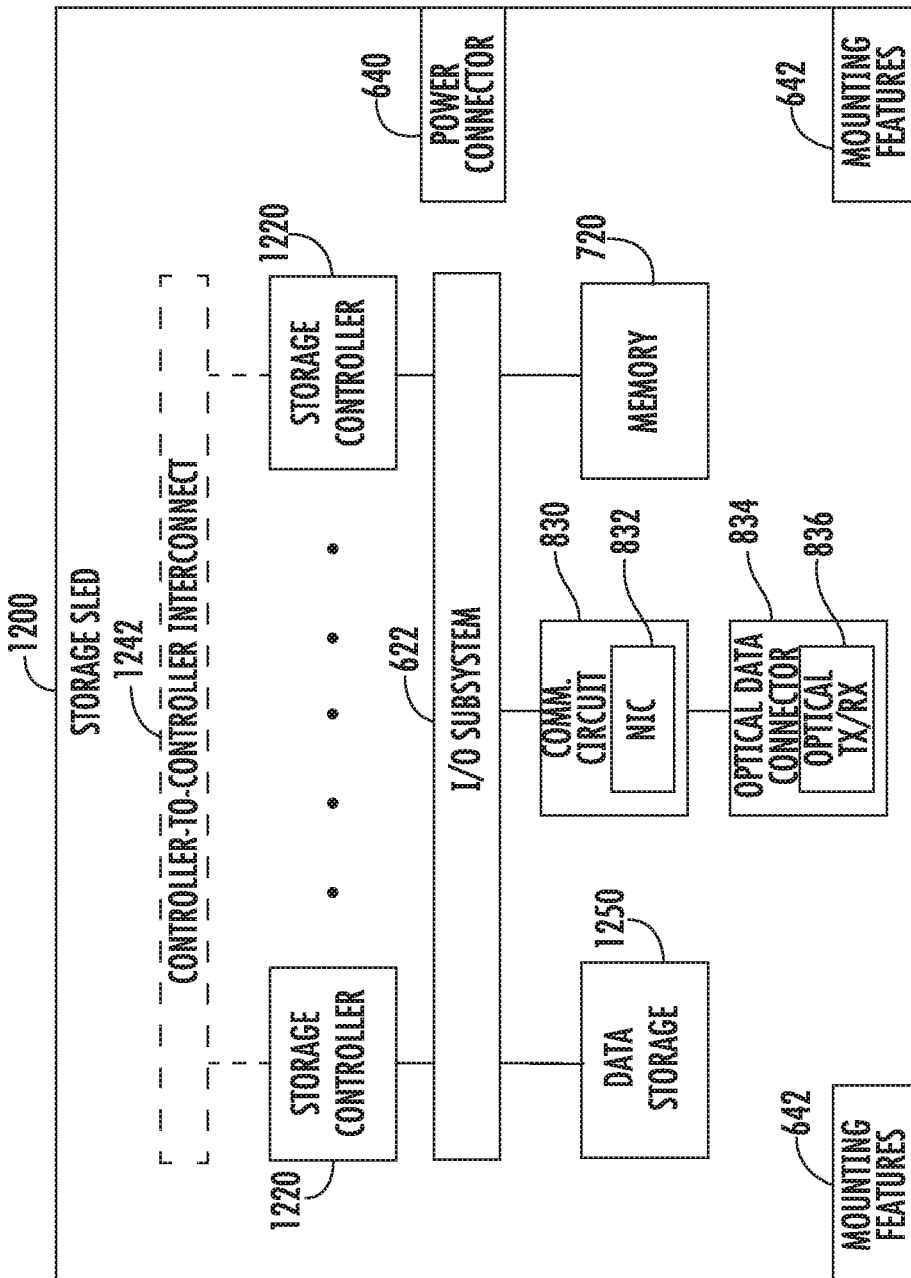
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
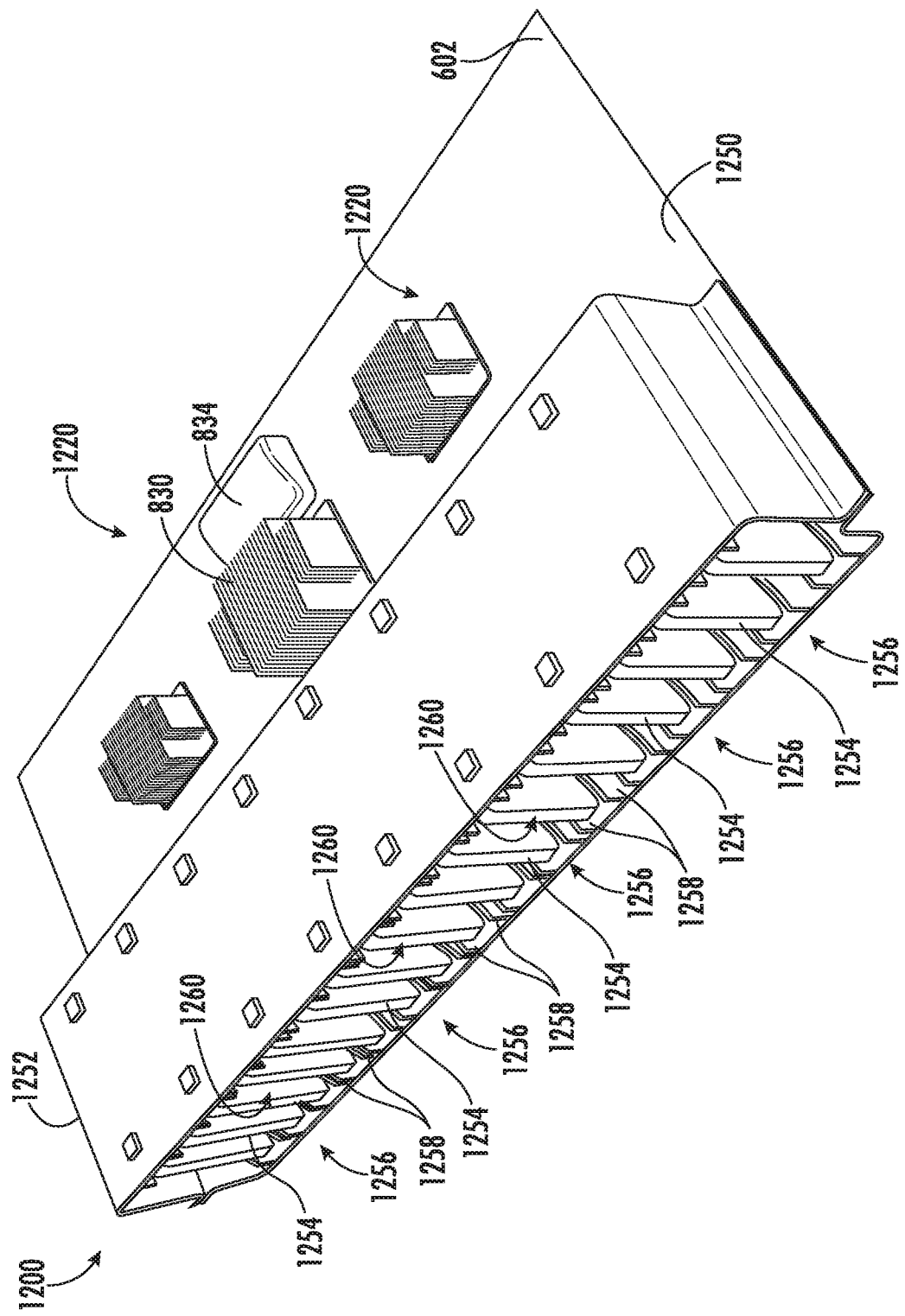
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
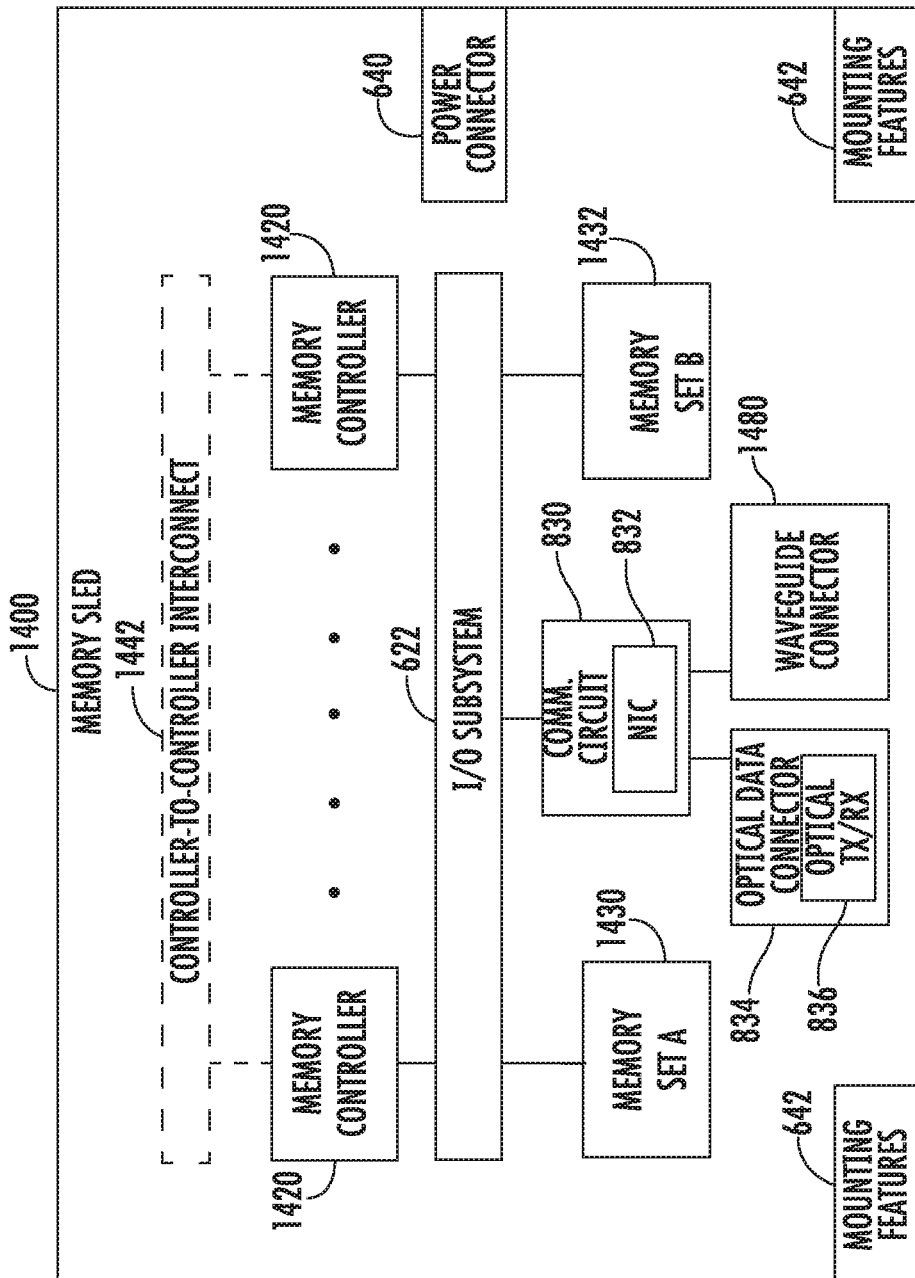
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
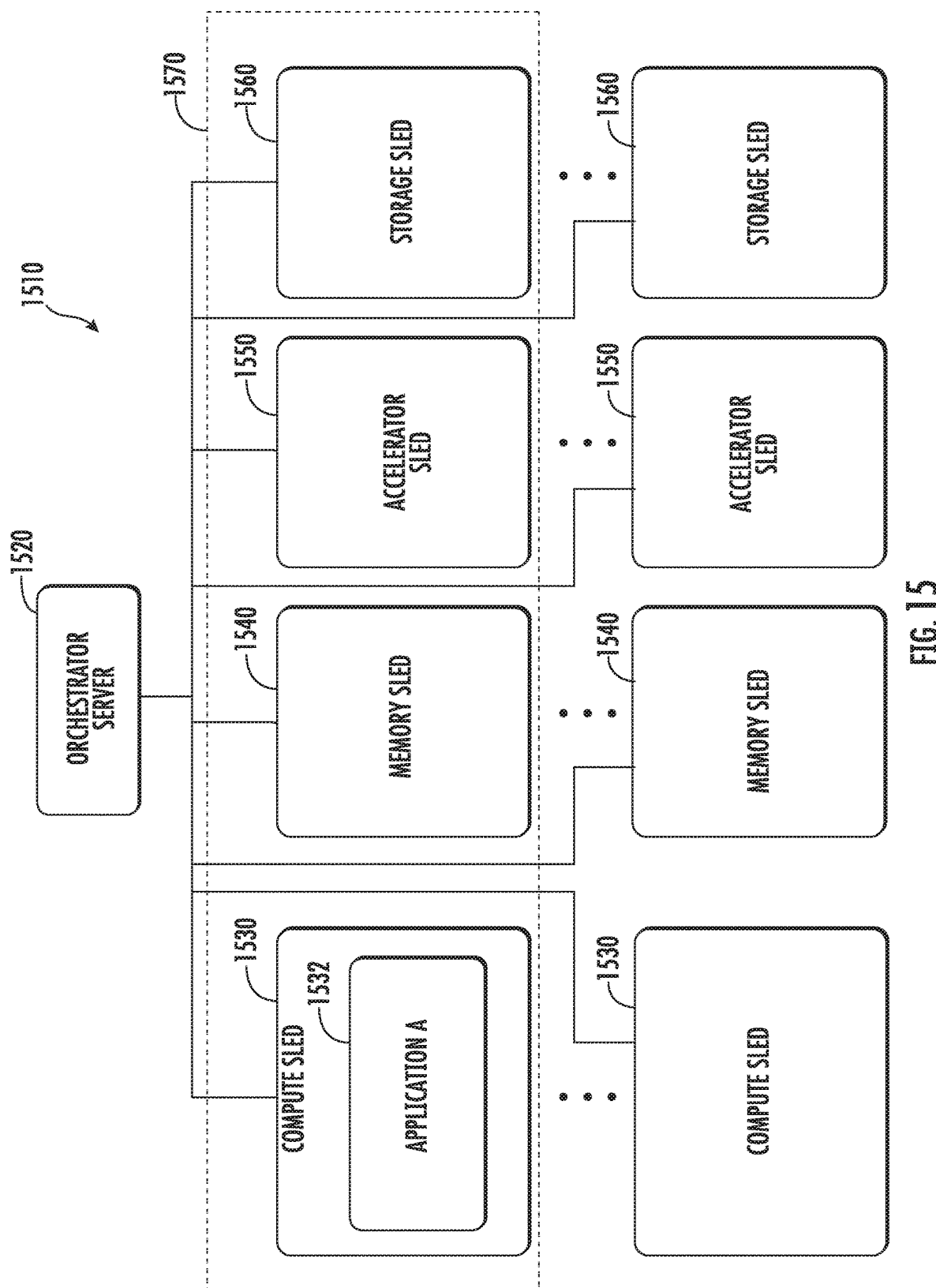
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
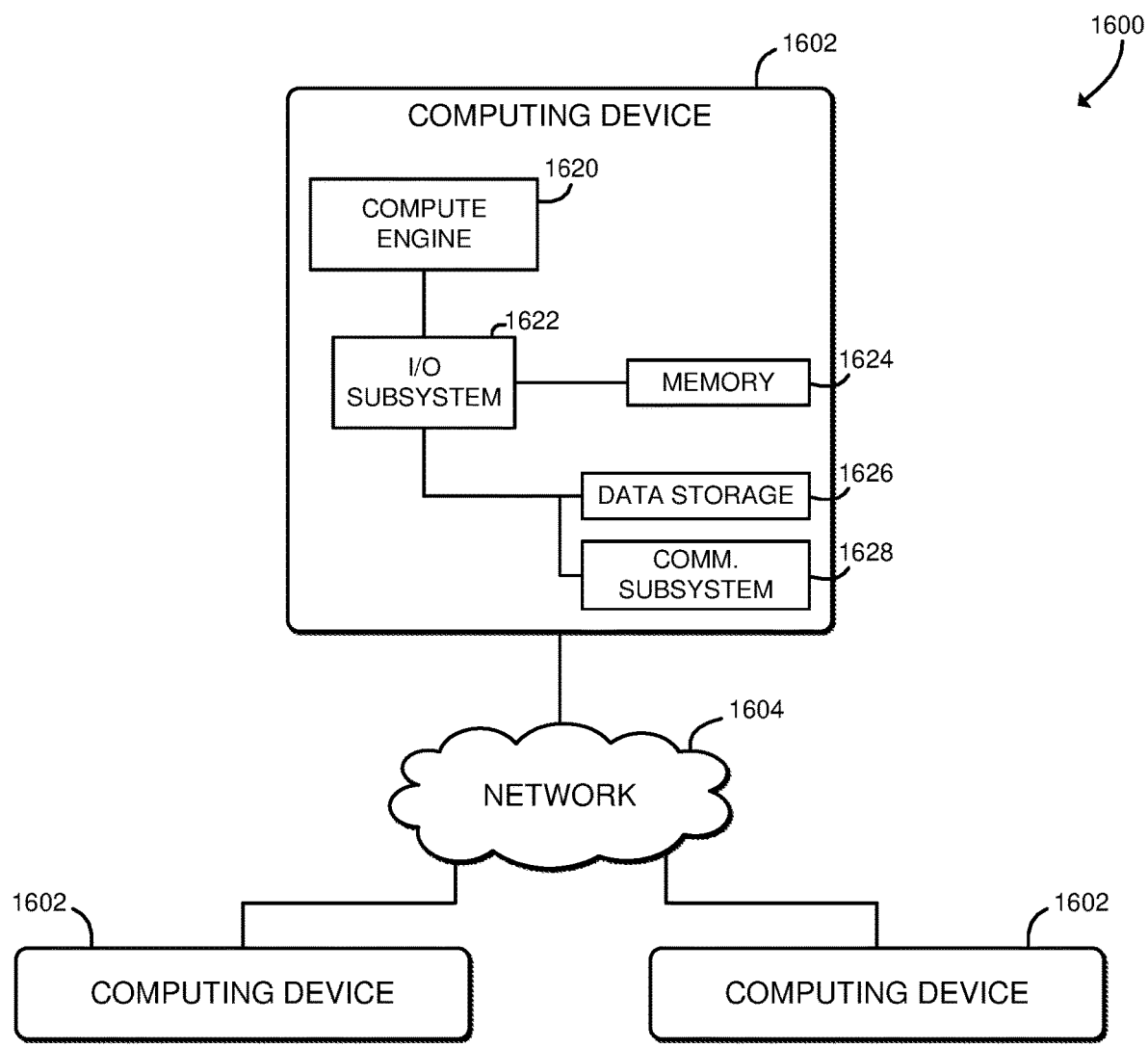
FIG. 16 is a simplified block diagram of at least one embodiment of a system for an improved network interface controller.

Referring now to FIG. 16, an illustrative system 1600 for an improved network interface controller includes multiple computing devices 1602 in communication over a network 1604. Each computing device 1602 may be embodied as one or more sleds 400 in a datacenter (e.g., compute sleds 800, accelerator sleds 1000, or another configuration). Each computing device 1602 includes a communication subsystem 1628 having a network interface controller (NIC) and multiple field-programmable gate arrays (FPGAs). In use, as described further below, the computing devices 1602 may exchange remote direct memory access (RDMA) messages over the network 1604. A receiving computing device 1602 receives an RDMA message with the NIC and transfers the message to a root FPGA over an I/O link, such as a PCI Express (PCIe) link. The root FPGA identifies a target FPGA based on an address of the message and transfers the message to the target FPGA over a high-speed serial link. The address of the message is included in a unified address space that is physically divided among the FPGAs. The target FPGA processes the RDMA message. Thus, the system 1600 allows for RDMA transfers to FPGAs within the computing devices 1602 using a unified address space. Additionally, the bandwidth of the I/O link between the root FPGA and the NIC may be large enough so as not to bottleneck traffic flow. Thus, the system 1600 may enable high-performance, accelerated processing of network traffic or other accelerated processing using multiple FPGAs coupled to the NIC.

The computing device 1602 may be embodied as any type of device capable of performing the functions described herein. For example, the computing device 1602 may be embodied as, without limitation, a sled, a compute sled, an accelerator sled, a storage sled, a computer, a server, a distributed computing device, a disaggregated computing device, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 1602 includes a compute engine 1620, an I/O subsystem 1622, a memory 1624, a data storage device 1626, and the communication subsystem 1628. Additionally, in some embodiments, one or more of the illustrative components may be incorporated in, or otherwise form a portion of, another component. For example, the memory 1624, or portions thereof, may be incorporated in the compute engine 1620 in some embodiments.

The compute engine 1620 may be embodied as any type of compute engine capable of performing the functions described herein. For example, the compute engine 1620 may be embodied as a single or multi-core processor(s), digital signal processor, microcontroller, field-programmable gate array (FPGA), or other configurable circuitry, application-specific integrated circuit (ASIC), or other processor or processing/controlling circuit. Similarly, the memory 1624 may be embodied as any type of volatile, non-volatile, or persistent memory or data storage capable of performing the functions described herein. In operation, the memory 1624 may store various data and software used during operation of the computing device 1602 such as operating systems, applications, programs, libraries, and drivers. As shown, the memory 1624 may be communicatively coupled to the compute engine 1620 via the I/O subsystem 1622, which may be embodied as circuitry and/or components to facilitate input/output operations with the compute engine 1620, the memory 1624, and other components of the computing device 1602. For example, the I/O subsystem 1622 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 1624 may be directly coupled to the compute engine 1620, for example via an integrated memory controller hub. Additionally, in some embodiments, the I/O subsystem 1622 may form a portion of a system-on-a-chip (SoC) and be incorporated, along with the compute engine 1620, the memory 1624, and/or other components of the computing device 1602, on a single integrated circuit chip.

The data storage device 1626 may be embodied as any type of device or devices configured for short-term or long-term storage of data such as, for example, memory devices and circuits, memory cards, hard disk drives, solid-state drives, non-volatile flash memory, 3D XPoint memory, persistent memory, or other data storage devices.

Figure 17:
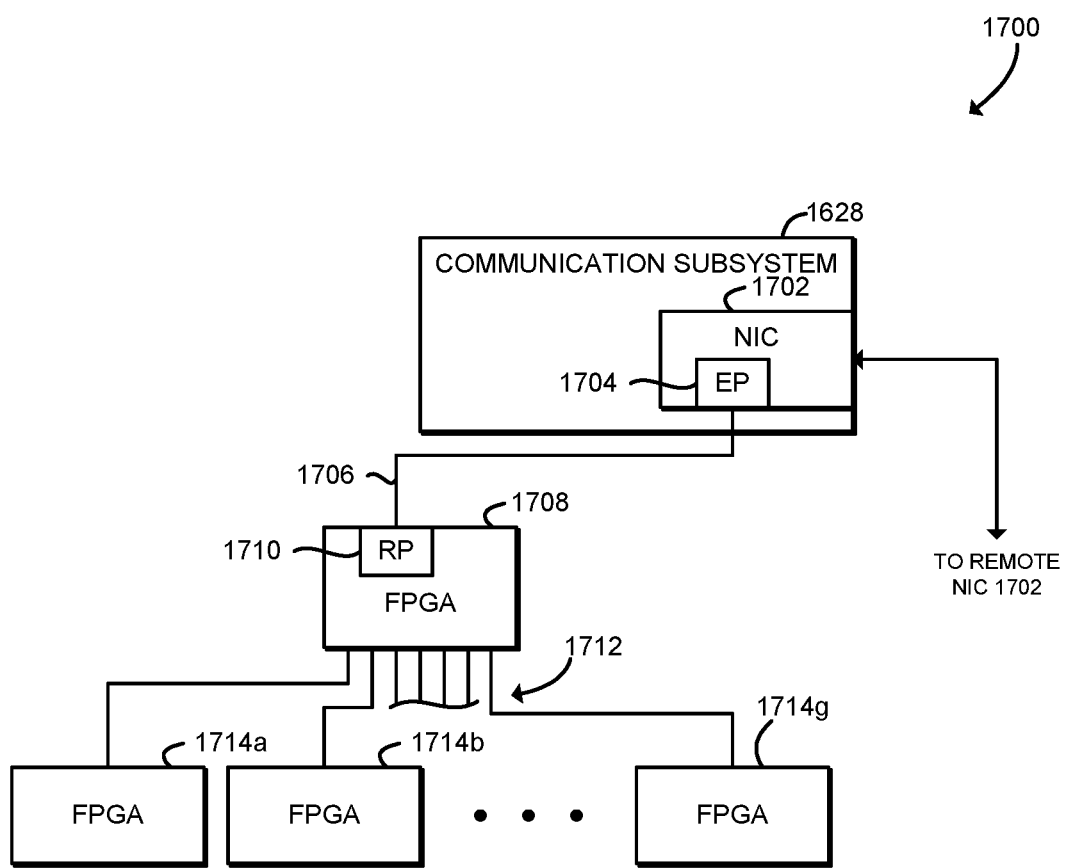
FIG. 17 is a simplified block diagram of at least one embodiment of a communication subsystem of a computing device of FIG. 16.

The computing device 1602 also includes the communication subsystem 1628, which may be embodied as any network interface controller (NIC), communication circuit, device, or collection thereof, capable of enabling communications between the computing device 1602 and other remote devices over a computer network. As described above, the communication subsystem 1628 includes a NIC and multiple FPGAs. One potential embodiment of the communication subsystem 1628 is shown in FIG. 17 and described below. The communication subsystem 1628 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication. Illustratively, the communication subsystem 1628 may communicate over high-speed Ethernet, such as 100 Gbps Ethernet.

As discussed in more detail below, the computing devices 1602 may be configured to transmit and receive data with each other and/or other devices of the system 1600 over the network 1604. The network 1604 may be embodied as any number of various wired and/or wireless networks. For example, the network 1604 may be embodied as, or otherwise include a wired or wireless local area network (LAN), and/or a wired or wireless wide area network (WAN). As such, the network 1604 may include any number of additional devices, such as additional computers, routers, and switches, to facilitate communications among the devices of the system 1600.

Referring now to FIG. 17, diagram 1700 illustrates one potential embodiment of the communication subsystem 1628. As shown, the communication subsystem 1628 includes a NIC 1702, and is coupled to a root FPGA 1708 and multiple worker FPGAs 1714. The NIC 1702 may be embodied as any network interface controller (NIC), host fabric interface (HFI), network processor, or other communication circuit capable of communication with a remote host, which is illustratively another NIC 1702 of a remote computing device 1602.

Each FPGA 1708, 1714 may be embodied as an integrated circuit including programmable digital logic resources that may be configured after manufacture. Each FPGA 1708, 1714 may include, for example, a configurable array of logic blocks in communication over a configurable data interchange. Each FPGA 1708, 1714 may also include or be coupled to an FPGA memory, which may be embodied as SRAM, DRAM, or other volatile or non-volatile memory of the FPGA 1708, 1714. Although illustrated as including FPGAs 1708, 1714, it should be understood that in some embodiments the computing device 1602 may include one or more other types of accelerators, such as application-specific integrated circuits (ASICs), coprocessors, or other digital logic devices capable of performing accelerated functions (e.g., accelerated network functions, or other accelerated functions). Additionally or alternatively, in some embodiments the FPGAs 1708, 1714 may be included in the communication subsystem 1628.

As shown in FIG. 17, the NIC 1702 is coupled to the root FPGA 1708 by an I/O link 1706, which is illustratively a PCIe link. The NIC 1702 includes a PCIe endpoint 1704, and the root FPGA 1708 includes a PCIe root port 1710. The root port 1710 (or root complex) may include one or more root ports, PCIe links, PCIe switches, and/or other components that may be used to communicate I/O data between the root FPGA 1708 and the NIC 1702. Similarly, the endpoint 1704 may communicate with the FPGA 1708 over PCIe and thus may be embodied as or otherwise include a PCIe physical layer, a PCIe data link layer, and a PCIe transaction layer. Illustratively, data may be transferred over the I/O link 1706 in one or more PCIe transaction layer packets (TLPs).

Each worker FPGA 1714 is coupled to the root FPGA 1708 by a high-speed serial link 1712. Illustratively, each serial link 1712 is an Interlaken link; however, any appropriate high-speed serial interface may be used. Each of the FPGAs 1708, 1714 may include appropriate components to communicate over the serial link 1712. For example, each FPGA 1708, 1714 may include an Interlaken interface as vendor-supplied logic or as a hard IP block.

Illustratively, the communication subsystem 1628 is coupled to a single root FPGA 1708 and seven worker FPGAs 1714*a* to 1714*g*, for eight total FPGAs 1708, 1714. In other embodiments, the communication subsystem 1628 may be coupled to a different number of FPGAs 1708, 1714. In each embodiment, the NIC 1702 includes one or more endpoints 1704 that are each connected by a single I/O link 1706 to a single root FPGA 1708. Thus, the bandwidth of the I/O link 1706 may be scaled or otherwise selected to provide sufficient bandwidth to process network traffic received by the NIC 1702 without additional bottlenecks. For example, in the illustrative embodiment the NIC 1702 is a 100 Gbps Ethernet NIC, and the I/O link 1706 is a 16-lane PCIe interconnection. In that embodiment, the I/O link 1706 has higher bandwidth than the NIC 1702. Additionally, although illustrated as a root FPGA 1708 and worker FPGAs 1714, it should be understood that in some embodiments each of the FPGAs 1708, 1714 may be otherwise similar (e.g., the same model). For example, in some embodiments each worker FPGA 1714 may also include a root port 1710 that is not connected to the NIC 1702 (or may be otherwise capable of establishing a root port 1710).

Figure 18:
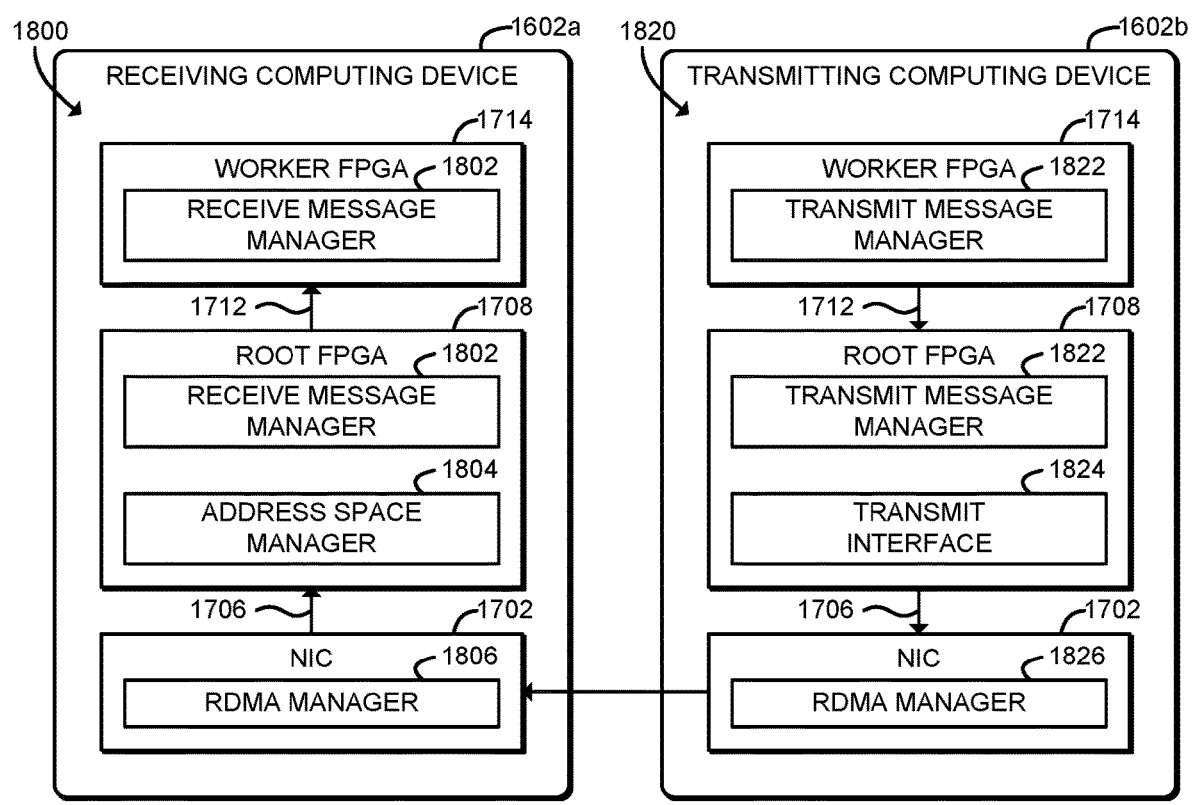
FIG. 18 is a simplified block diagram of at least one embodiment of various environments that may be established by the system of FIGS. 16-17.

Referring now to FIG. 18, in an illustrative embodiment, a receiving computing device 1602*a* establishes an environment 1800 during operation. The illustrative environment 1800 includes a receive message manager 1802, an address space manager 1804, and an RDMA manager 1806. The various components of the environment 1800 may be embodied as hardware, firmware, software, or a combination thereof. As such, in some embodiments, one or more of the components of the environment 1800 may be embodied as circuitry or collection of electrical devices (e.g., receive message circuitry 1802, address space circuitry 1804, and/or RDMA circuitry 1806). It should be appreciated that, in such embodiments, one or more of the receive message circuitry 1802, the address space circuitry 1804, and/or the RDMA circuitry 1806 may form a portion of the communication subsystem 1628, the I/O subsystem 1622, and/or other components of the computing device 1602. Additionally, in some embodiments, one or more of the illustrative components may form a portion of another component and/or one or more of the illustrative components may be independent of one another.

As shown, the NIC 1702 establishes the RDMA manager 1806, which is configured to receive an RDMA message from a remote host, such as a transmitting computing device 1602*b*. The RDMA message includes a memory address within a unified address space. The RDMA manager 1806 is further configured to send the RDMA message to the root FPGA 1708 via the I/O link 1706.

The root FPGA 1708 establishes the address space manager 1804, which is configured to determine a target worker FPGA 1714 for the RDMA message based on the memory address of the RDMA message. Each of the root FPGA 1708 and the worker FPGAs 1714 are associated with a corresponding part of the unified address space. For example, determining the target worker FPGA 1714 may include indexing the unified address space with the memory address to identify a targeted part of the unified address space and then identifying the FPGA 1708, 1714 associated with that target part of the unified address space. The address space manager 1804 is further configured to send or otherwise forward the RDMA message to the target worker FPGA 1714 via the corresponding serial link 1712. The RDMA message may be sent via a memory access protocol. In some embodiments, the target of the memory address may be the root FPGA 1708. In those embodiments, the root FPGA 1708 may not send the RDMA message to any worker FPGA 1714.

Each of the worker FPGA 1714 and the root FPGA 1708 establishes a receive message manager 1802, which is configured to process the RDMA message. Processing the RDMA message may include writing data to or reading data from a memory coupled to the target FPGA 1708, 1714 at a memory location associated with the memory address.

Still referring to FIG. 18, in the illustrative embodiment, the transmitting computing device 1602*b* establishes an environment 1820 during operation. The illustrative environment 1820 includes a transmit message manager 1822, a transmit interface 1824, and an RDMA manager 1826. The various components of the environment 1820 may be embodied as hardware, firmware, software, or a combination thereof. As such, in some embodiments, one or more of the components of the environment 1820 may be embodied as circuitry or collection of electrical devices (e.g., transmit message circuitry 1822, transmit interface circuitry 1824, and/or RDMA circuitry 1826). It should be appreciated that, in such embodiments, one or more of the transmit message circuitry 1822, the transmit interface circuitry 1824, and/or the RDMA circuitry 1826 may form a portion of the communication subsystem 1628, the I/O subsystem 1622, and/or other components of the computing device 1602. Additionally, in some embodiments, one or more of the illustrative components may form a portion of another component and/or one or more of the illustrative components may be independent of one another.

As shown, each of the worker FPGA 1714 and the root FPGA 1708 establishes a transmit message manager 1822, which is configured to generate an RDMA message. The RDMA message includes a memory address. In some embodiments, the memory address is included in a part of a unified address space that is associated with the generating FPGA 1708, 1714. In some embodiments, generating the RDMA message may include reading data from a memory coupled to the generating FPGA 1708, 1714 at a memory location associated with the memory address. The transmit message manager 1822 of each worker FPGA 1714 is further configured to send or otherwise forward the RDMA message to the root FPGA 1708 via the serial link 1712 between the root FPGA 1708 and that worker FPGA 1714. The RDMA message may be sent via a memory access protocol.

The root FPGA 1708 establishes the transmit interface 1824, which is configured to send the RDMA message to the NIC 1702 via the I/O link 1706. The NIC 1702 establishes the RDMA manager 1806, which is configured to send the RDMA message to a remote host, such as the receiving computing device 1602a.

Although the environments 1800, 1820 are illustrated in FIG. 18 as being established by the separate receiving computing device 1602a and transmitting computing device 1602b, it should be understood that a single computing device 1602 may perform both receive and transmit operations and thus a single computing device 1602 may establish both environments 1800, 1820.

Figure 19:
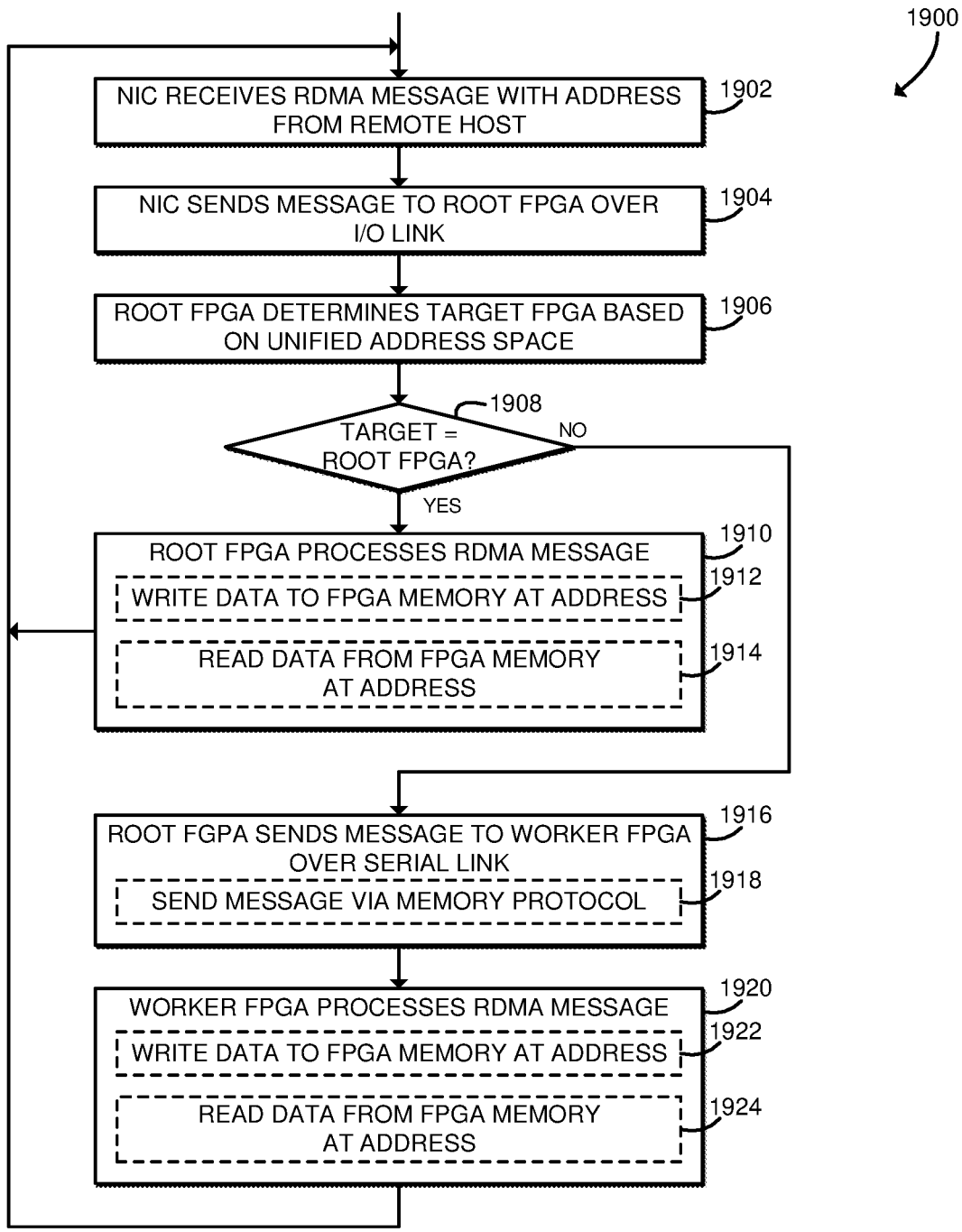
FIG. 19 is a simplified flow diagram of at least one embodiment of a method for processing received remote direct memory access messages that may be executed by a computing device of FIGS. 16-18.

Referring now to FIG. 19, in use, a computing device 1602 may execute a method 1900 for processing received RDMA messages. It should be appreciated that, in some embodiments, the operations of the method 1900 may be performed by one or more components of the environment 1800 of the receiving computing device 1602a as shown in FIG. 18. The method 1900 begins in block 1902, in which the NIC 1702 receives an RDMA message from a remote host (e.g., another computing device 1602). The RDMA message may be embodied as any remote data access message, control message, or other message to perform an RDMA operation. The RDMA message includes a memory address that is located within a unified address space (e.g., a 64-bit address space). For example, the RDMA message may include data to be written to a location in the unified address space identified by the memory address (e.g., a write command, a put command, a read response, or other message including data). As another example, the RDMA message may request that data be read from the location in the unified address space that is identified by the memory address (e.g., a read request, a get command, or other message requesting data). As described further below, the memory locations referenced by the unified address space are physically distributed among the FPGAs 1708, 1714.

In block 1904, the NIC 1702 sends the RDMA message over the I/O link 1706 to the root FPGA 1708. The NIC 1702 may perform any encapsulation, translation, or other conversion operation required to transmit the RDMA message over the I/O link 1706. For example, the RDMA message may be included in one or more PCIe TLP packets transmitted over the I/O link 1706.

In block 1906, the root FPGA 1708 determines a target FPGA 1708, 1714 based on the location of the memory address within the unified address space. Each FPGA 1708, 1714 may be associated with a range or other part of the unified address space. The root FPGA 1708 may use any technique to identify the target FPGA 1708, 1714 associated with the address. For example, the root FPGA 1708 may index one or more page tables or other data structures with the memory address to identify the associated FPGA 1708, 1714. As another example, the root FPGA 1708 may map the memory address to the associated 1708, 1714 using a mapping function or other indexing function. In block 1908, the root FPGA 1708 determines whether the target FPGA 1708, 1714 is the root FPGA 1708 (i.e., whether the memory address is associated with the root FPGA 1708). If not, the method 1900 branches to block 1916, described below. If the root FPGA 1708 is the target of the memory address, the method 1900 advances to block 1910.

In block 1910, the root FPGA 1708 processes the RDMA message. Processing the RDMA message may include performing any appropriate RDMA operations specified by the RDMA message. In some embodiments, in block 1912 the root FPGA 1708 may write data to a memory coupled to the root FPGA 1708 at a location specified by the memory address. For example, the root FPGA 1708 may write data supplied with a write command, a put command, a read response, or other RDMA message including data for writing. In some embodiments, in block 1914, the root FPGA 1708 may read data from the memory coupled to the root FPGA 1708 at a location specified by the memory address. For example, the root FPGA 1708 may read data requested by a read request command. The FPGA 1708 may send that data back to the requestor with a read response message, as described below in connection with FIG. 20. After processing the RDMA message, the method 1900 loops back to block 1902 to process additional RDMA messages.

Referring back to block 1908, if the target of the RDMA message is not the root FPGA 1708 (i.e., it is a worker FPGA 1714), the method 1900 branches to block 1916. In block 1916, the root FPGA 1708 sends the RDMA message to the target worker FPGA 1714 over the corresponding serial link 1712 between the root FPGA 1708 and that worker FPGA 1714. The root FPGA 1708 may perform any encapsulation, translation, or other conversion operation required to transmit the RDMA message over the serial link 1712. In some embodiments, in block 1918, the root FPGA 1708 may transmit the RDMA message via a memory protocol. For example, the RDMA message may be transmitted as one or more store operations, load operations, or other memory access operations. The memory protocol thus may be relatively simplified as compared to an I/O protocol (e.g., PCI Express).

In block 1920, the worker FPGA 1714 processes the RDMA message. Processing the RDMA message may include performing any appropriate RDMA operations specified by the RDMA message. In some embodiments, in block 1922 the worker FPGA 1714 may write data to a memory coupled to the worker FPGA 1714 at a location specified by the memory address. For example, the worker FPGA 1714 may write data supplied with a write command, a put command, a read response, or other RDMA message including data for writing. In some embodiments, in block 1924, the worker FPGA 1714 may read data from the memory coupled to the worker FPGA 1714 at a location specified by the memory address. For example, the worker FPGA 1714 may read data requested by a read request command. The FPGA 1714 may send that data back to the requestor with a read response message, as described below in connection with FIG. 20. After processing the RDMA message, the method 1900 loops back to block 1902 to process additional RDMA messages.

Figure 20:
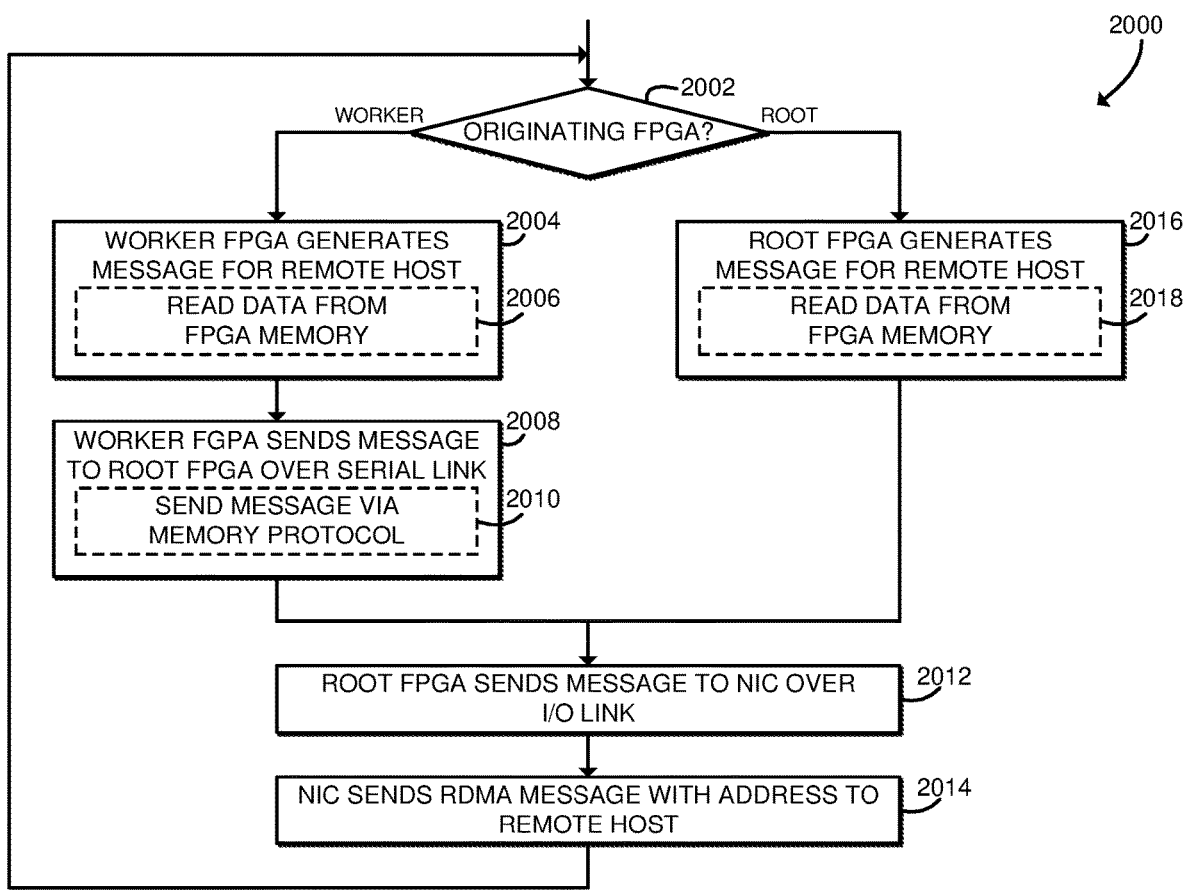
FIG. 20 is a simplified flow diagram of at least one embodiment of a method for processing remote direct memory access messages for transmission that may be executed by a computing device of FIGS. 16-18.

Referring now to FIG. 20, in use, a computing device 1602 may execute a method 2000 for processing RDMA messages for transmission. It should be appreciated that, in some embodiments, the operations of the method 2000 may be performed by one or more components of the environment 1820 of the transmitting computing device 1602*b* as shown in FIG. 18. The method 2000 begins in block 2002, in which it is determined whether an RDMA message originates from a worker FPGA 1714 or from the root FPGA 1708. The determination of the originating FPGA 1708, 1714 may depend on, for example, the particular workload being processed by the computing device 1602 and/or the relative order of processing performed by the FPGAs 1708, 1714. If the RDMA message originates with the root FPGA 1708, the method 2000 branches to block 2016, described below. If the RDMA message originates with a worker FPGA 1714, the method 2000 branches to block 2004. Additionally or alternatively, although illustrated as being generated sequentially, it should be understood that in some embodiments the FPGAs 1708, 1714 may generate RDMA messages in parallel or otherwise independently.

In block 2004, the worker FPGA 1714 generates an RDMA message for a remote host (e.g., another computing device 1602). The RDMA message may be embodied as any remote data access message, control message, or other message to perform an RDMA operation. The RDMA message may include a memory address that is located within a unified address space (e.g., a 64-bit address space). For example, the RDMA message may include data to be written to a location in the unified address space identified by the memory address (e.g., a write command, a put command, a read response, or other message including data). As another example, the RDMA message may request that data be read from the location in the unified address space that is identified by the memory address (e.g., a read request, a get command, or other message requesting data). As described above, the unified address space is physically distributed among the FPGAs 1708, 1714 of the receiving computing device 1602. In some embodiments, in block 2006 the worker FPGA 1714 may read data from memory coupled to the worker FPGA 1714. The data may be included in the RDMA message, to be written to the receiving computing device 1602. For example, the worker FPGA 1714 may read data to supply with a write request, a put command, or similar message. As another example, to prepare a read response, the worker FPGA 1714 may read data previously requested by a read request to supply with the read response.

In block 2008, the worker FPGA 1714 sends the RDMA message to the root FPGA 1708 over the corresponding serial link 1712 between the root FPGA 1708 and the worker FPGA 1714. The worker FPGA 1714 may perform any encapsulation, translation, or other conversion operation required to transmit the RDMA message over the serial link 1712. In some embodiments, in block 2010, the worker FPGA 1714 may transmit the RDMA message via a memory protocol. For example, the RDMA message may be transmitted as one or more store operations, load operations, or other memory access operations. The memory protocol thus may be relatively simplified as compared to an I/O protocol (e.g., PCI Express).

In block 2012, the root FPGA 1708 sends the RDMA message over the I/O link 1706 to the NIC 1702. The root FPGA 1708 may perform any encapsulation, translation, or other conversion operation required to transmit the RDMA message over the I/O link 1706. For example, the RDMA message may be included in one or more PCIe TLP packets transmitted over the I/O link 1706.

In block 2014, the NIC 1702 sends the RDMA message to a remote host. The receiving host (e.g., a receiving computing device 1602) may process the RDMA message as described above in connection with FIG. 19. After sending the RDMA message, the method 2000 loops back to block 2002 to continue processing RDMA messages for transmission.

Referring back to block 2002, if the RDMA message originates with the root FPGA 1708, the method 2000 branches to block 2016. In block 2016, the root FPGA 1708 generates an RDMA message for a remote host (e.g., another computing device 1602). As described above, the RDMA message may be embodied as any remote data access message, control message, or other message to perform an RDMA operation. The RDMA message may include a memory address that is located within a unified address space (e.g., a 64-bit address space). For example, the RDMA message may include data to be written to a location in the unified address space identified by the memory address (e.g., a write command, a put command, a read response, or other message including data). As another example, the RDMA message may request that data be read from the location in the unified address space that is identified by the memory address (e.g., a read request, a get command, or other message requesting data). As described above, the unified address space is physically distributed among the FPGAs 1708, 1714 of the receiving computing device 1602. In some embodiments, in block 2018 the root FPGA 1708 may read data from memory coupled to the root FPGA 1708. The data may be included in the RDMA message, to be written to the receiving computing device 1602. For example, the root FPGA 1708 may read data to supply with a write request, a put command, or similar message. As another example, to prepare a read response, the root FPGA 1708 may read data previously requested by a read request to supply with the read response. After generating the RDMA message, the method 2000 advances to block 2012, in which the root FPGA 1708 sends the RDMA message to the NIC 1702 over the I/O link 1706, as described above.

EXAMPLES

Illustrative examples of the technologies disclosed herein are provided below. An embodiment of the technologies may include any one or more, and any combination of, the examples described below.

Example 1 includes a computing device for remote direct memory access (RDMA), the computing device comprising: a network interface controller; a root field programmable-gate array (FPGA) coupled to the network interface controller by an I/O link; and a plurality of worker FPGAs, wherein each worker FPGA is coupled to the root FPGA by a corresponding serial link; wherein the network interface controller comprises an RDMA manager to (i) receive an RDMA message from a remote host, wherein the RDMA message comprises a memory address in a unified address space and (ii) send the RDMA message to the root FPGA via the I/O link; wherein the root FPGA comprises an address space manager to (i) determine a first target FPGA of the plurality of worker FPGAs for the RDMA message based on the memory address of the RDMA message, wherein the root FPGA and each of the plurality of worker FPGAs are each associated with a corresponding part of the unified address space, and (ii) forward the RDMA message to the first target FPGA via the serial link between the root FPGA and the first target FPGA; and wherein the first target FPGA comprises a receive message manager to process the RDMA message.

Example 2 includes the subject matter of Example 1, and wherein: the address space manager is further to determine, by the root FPGA, that the first target FPGA is the root FPGA based on the memory address of the RDMA message; and the root FPGA further comprises a receive message manager to process the RDMA message in response to a determination that the first target FPGA is the root FPGA.

Example 3 includes the subject matter of any of Examples 1 and 2, and wherein the I/O link comprises a PCI Express link.

Example 4 includes the subject matter of any of Examples 1-3, and wherein: the network interface controller comprises a PCI endpoint; the root FPGA comprises a PCI root port; and the I/O link is coupled to the PCI endpoint of the network interface controller and to the PCI root port of the root FPGA.

Example 5 includes the subject matter of any of Examples 1-4, and wherein each serial link comprises an Interlaken link.

Example 6 includes the subject matter of any of Examples 1-5, and wherein to send the RDMA message to the root FPGA via the I/O link comprises to send the RDMA message via one or more PCI transaction layer packets.

Example 7 includes the subject matter of any of Examples 1-6, and wherein to forward the RDMA message to the first target FPGA via the serial link comprises to forward the RDMA message via a memory access protocol, wherein the memory access protocol is simplified with respect to an I/O protocol.

Example 8 includes the subject matter of any of Examples 1-7, and wherein to determine the first target FPGA based on the memory address comprises to: index the unified address space with the memory address to identify a first part of the unified address space; and identify the first target FPGA based on an association with the first part of the unified address space.

Example 9 includes the subject matter of any of Examples 1-8, and wherein to process the RDMA message comprises to write data to a memory coupled to the first target FPGA at a memory location associated with the memory address.

Example 10 includes the subject matter of any of Examples 1-9, and wherein to process the RDMA message comprises to read data from a memory coupled to the first target FPGA at a memory location associated with the memory address.

Example 11 includes a computing device for remote direct memory access (RDMA), the computing device comprising: a network interface controller; a root field programmable-gate array (FPGA) coupled to the network interface controller by an I/O link; a plurality of worker FPGAs, wherein each worker FPGA is coupled to the root FPGA by a corresponding serial link; wherein a first worker FPGA comprises a transmit message manager to (i) generate an RDMA message, wherein the RDMA message comprises a memory address, and (ii) forward the RDMA message to the root FPGA via the serial link between the root FPGA and the first worker FPGA; wherein the root FPGA comprises a transmit interface to send the RDMA message to a network interface controller of the computing device via an I/O link; and the network interface controller comprises an RDMA manager to send the RDMA message to a remote host.

Example 12 includes the subject matter of Example 11, and wherein the memory address is included in a unified address space, and wherein the memory address is included in a part of the unified address space that is associated with the first worker FPGA.

Example 13 includes the subject matter of any of Examples 11 and 12, and wherein to generate the RDMA message comprises to read data from a memory coupled to the first worker FPGA at a memory location associated with the memory address.

Example 14 includes the subject matter of any of Examples 11-13, and wherein to forward the RDMA message to the root FPGA via the serial link comprises to forward the RDMA message via a memory access protocol.

Example 15 includes the subject matter of any of Examples 11-14, and wherein each serial link comprises an Interlaken link.

Example 16 includes the subject matter of any of Examples 11-15, and wherein the I/O link comprises a PCI Express link.

Example 17 includes the subject matter of any of Examples 11-16, and wherein: the network interface controller comprises a PCI endpoint; the root FPGA comprises a PCI root port; and the I/O link is coupled to the PCI endpoint of the network interface controller and to the PCI root port of the root FPGA.

Example 18 includes the subject matter of any of Examples 11-17, and wherein to send the RDMA message to the network interface controller via the I/O link comprises to send the RDMA message via one or more PCI transaction layer packets.

Example 19 includes a method for remote direct memory access (RDMA), the method comprising: receiving, by a network interface controller of a computing device, an RDMA message from a remote host, wherein the RDMA message comprises a memory address in a unified address space; sending, by the network interface controller, the RDMA message to a root field programmable-gate array (FPGA) of the computing device via an I/O link; determining, by the root FPGA, a first target FPGA of a plurality of worker FPGAs of the computing device for the RDMA message based on the memory address of the RDMA message, wherein the root FPGA and each of the plurality of worker FPGAs are each associated with a corresponding part of the unified address space; forwarding, by the root FPGA, the RDMA message to the first target FPGA via a serial link between the root FPGA and the first target FPGA, wherein the root FPGA is coupled to each of the plurality of worker FPGAs by a corresponding serial link; and processing, by the first target FPGA, the RDMA message.

Example 20 includes the subject matter of Example 19, and further comprising: determining, by the root FPGA, that the first target FPGA is the root FPGA based on the memory address of the RDMA message; and processing, by the root FPGA, the RDMA message in response to determining that the first target FPGA is the root FPGA.

Example 21 includes the subject matter of any of Examples 19 and 20, and wherein the I/O link comprises a PCI Express link.

Example 22 includes the subject matter of any of Examples 19-21, and wherein: the network interface controller comprises a PCI endpoint; the root FPGA comprises a PCI root port; and the I/O link is coupled to the PCI endpoint of the network interface controller and to the PCI root port of the root FPGA.

Example 23 includes the subject matter of any of Examples 19-22, and wherein each serial link comprises an Interlaken link.

Example 24 includes the subject matter of any of Examples 19-23, and wherein sending the RDMA message to the root FPGA via the I/O link comprises sending the RDMA message via one or more PCI transaction layer packets.

Example 25 includes the subject matter of any of Examples 19-24, wherein forwarding the RDMA message to the first target FPGA via the serial link comprises forwarding the RDMA message via a memory access protocol, wherein the memory access protocol is simplified with respect to an I/O protocol.

Example 26 includes the subject matter of any of Examples 19-25, and wherein determining the first target FPGA based on the memory address comprises: indexing the unified address space with the memory address to identify a first part of the unified address space; and identifying the first target FPGA based on an association with the first part of the unified address space.

Example 27 includes the subject matter of any of Examples 19-26, and wherein processing the RDMA message comprises writing data to a memory coupled to the first target FPGA at a memory location associated with the memory address.

Example 28 includes the subject matter of any of Examples 19-27, and wherein processing the RDMA message comprises reading data from a memory coupled to the first target FPGA at a memory location associated with the memory address.

Example 29 includes a method for remote direct memory access (RDMA), the method comprising: generating, by a first worker field programmable-gate array (FPGA) of a computing device, an RDMA message, wherein the RDMA message comprises a memory address; forwarding, by the first worker FPGA, the RDMA message to a root FPGA of the computing device via a serial link between the root FPGA and the first worker FPGA, wherein the root FPGA is coupled to each of a plurality of worker FPGAs by a corresponding serial link; sending, by the root FPGA, the RDMA message to a network interface controller of the computing device via an I/O link; and sending, by the network interface controller, the RDMA message to a remote host.

Example 30 includes the subject matter of Example 29, and wherein the memory address is included in a unified address space, and wherein the memory address is included in a part of the unified address space that is associated with the first worker FPGA.

Example 31 includes the subject matter of any of Examples 29 and 30, and wherein generating the RDMA message comprises reading data from a memory coupled to the first worker FPGA at a memory location associated with the memory address.

Example 32 includes the subject matter of any of Examples 29-31, and wherein forwarding the RDMA message to the root FPGA via the serial link comprises forwarding the RDMA message via a memory access protocol.

Example 33 includes the subject matter of any of Examples 29-32, and wherein each serial link comprises an Interlaken link.

Example 34 includes the subject matter of any of Examples 29-33, and wherein the I/O link comprises a PCI Express link.

Example 35 includes the subject matter of any of Examples 29-34, and wherein: the network interface controller comprises a PCI endpoint; the root FPGA comprises a PCI root port; and the I/O link is coupled to the PCI endpoint of the network interface controller and to the PCI root port of the root FPGA.

Example 36 includes the subject matter of any of Examples 29-35, and wherein sending the RDMA message to the network interface controller via the I/O link comprises sending the RDMA message via one or more PCI transaction layer packets.

Example 37 includes a computing device comprising: a processor; and a memory having stored therein a plurality of instructions that when executed by the processor cause the computing device to perform the method of any of Examples 19-36.

Example 38 includes one or more non-transitory, computer readable storage media comprising a plurality of instructions stored thereon that in response to being executed result in a computing device performing the method of any of Examples 19-36.

Example 39 includes a computing device comprising means for performing the method of any of Examples 19-36.

The invention claimed is:

1. A computing device for remote direct memory access (RDMA), the computing device comprising:
a network interface controller;
a root field programmable-gate array (FPGA) coupled to the network interface controller by an I/O link; and
a plurality of worker FPGAs, wherein each worker FPGA is coupled to the root FPGA by a corresponding serial link;
wherein the network interface controller comprises an RDMA manager to (i) receive an RDMA message from a remote host, wherein the RDMA message comprises a memory address in a unified address space and (ii) send the RDMA message to the root FPGA via the I/O link;
wherein the root FPGA comprises an address space manager to (i) determine a first target FPGA of the plurality of worker FPGAs for the RDMA message based on the memory address of the RDMA message, wherein the root FPGA and each of the plurality of worker FPGAs are each associated with a corresponding part of the unified address space, and (ii) forward the RDMA message to the first target FPGA via the serial link between the root FPGA and the first target FPGA; and
wherein the first target FPGA comprises a receive message manager to process the RDMA message.

2. The computing device of claim 1, wherein:
the address space manager is further to determine, by the root FPGA, that the first target FPGA is the root FPGA based on the memory address of the RDMA message; and
the root FPGA further comprises a receive message manager to process the RDMA message in response to a determination that the first target FPGA is the root FPGA.

3. The computing device of claim 1, wherein the I/O link comprises a PCI Express link.

4. The computing device of claim 3, wherein:
the network interface controller comprises a PCI endpoint;
the root FPGA comprises a PCI root port; and
the I/O link is coupled to the PCI endpoint of the network interface controller and to the PCI root port of the root FPGA.

5. The computing device of claim 1, wherein each serial link comprises an Interlaken link.

6. The computing device of claim 1, wherein to send the RDMA message to the root FPGA via the I/O link comprises to send the RDMA message via one or more PCI transaction layer packets.

7. The computing device of claim 1, wherein to forward the RDMA message to the first target FPGA via the serial link comprises to forward the RDMA message via a memory access protocol, wherein the memory access protocol is simplified with respect to an I/O protocol.

8. The computing device of claim 1, wherein to determine the first target FPGA based on the memory address comprises to:
index the unified address space with the memory address to identify a first part of the unified address space; and
identify the first target FPGA based on an association with the first part of the unified address space.

9. The computing device of claim 1, wherein to process the RDMA message comprises to write data to a memory coupled to the first target FPGA at a memory location associated with the memory address.

10. The computing device of claim 1, wherein to process the RDMA message comprises to read data from a memory coupled to the first target FPGA at a memory location associated with the memory address.

11. One or more non-transitory, computer-readable storage media comprising a plurality of instructions stored thereon that, in response to being executed, cause a computing device to:
receive, by a network interface controller of the computing device, an RDMA message from a remote host, wherein the RDMA message comprises a memory address in a unified address space;
send, by the network interface controller, the RDMA message to a root field programmable-gate array (FPGA) of the computing device via an I/O link;
determine, by the root FPGA, a first target FPGA of a plurality of worker FPGAs of the computing device for the RDMA message based on the memory address of the RDMA message, wherein the root FPGA and each of the plurality of worker FPGAs are each associated with a corresponding part of the unified address space;
forward, by the root FPGA, the RDMA message to the first target FPGA via a serial link between the root FPGA and the first target FPGA, wherein the root FPGA is coupled to each of the plurality of worker FPGAs by a corresponding serial link; and
process, by the first target FPGA, the RDMA message.

12. The one or more non-transitory, computer-readable storage media of claim 11, further comprising a plurality of instructions stored thereon that, in response to being executed, cause the computing device to:
determine, by the root FPGA, that the first target FPGA is the root FPGA based on the memory address of the RDMA message; and
process, by the root FPGA, the RDMA message in response to determining that the first target FPGA is the root FPGA.

13. The one or more non-transitory, computer-readable storage media of claim 11, wherein to send the RDMA message to the root FPGA via the I/O link comprises to send the RDMA message via one or more PCI transaction layer packets.

14. The one or more non-transitory, computer-readable storage media of claim 11, wherein to forward the RDMA message to the first target FPGA via the serial link comprises to forward the RDMA message via a memory access protocol, wherein the memory access protocol is simplified with respect to an I/O protocol.

15. The one or more non-transitory, computer-readable storage media of claim 11, wherein to determine the first target FPGA based on the memory address comprises to:
index the unified address space with the memory address to identify a first part of the unified address space; and
identify the first target FPGA based on an association with the first part of the unified address space.

16. The one or more non-transitory, computer-readable storage media of claim 11, wherein to process the RDMA message comprises to write data to a memory coupled to the first target FPGA at a memory location associated with the memory address.

17. The one or more non-transitory, computer-readable storage media of claim 11, wherein to process the RDMA message comprises to read data from a memory coupled to the first target FPGA at a memory location associated with the memory address.

18. A computing device for remote direct memory access (RDMA), the computing device comprising:
a network interface controller;
a root field programmable-gate array (FPGA) coupled to the network interface controller by an I/O link;
a plurality of worker FPGAs, wherein each worker FPGA is coupled to the root FPGA by a corresponding serial link;
wherein a first worker FPGA comprises a transmit message manager to (i) generate an RDMA message, wherein the RDMA message comprises a memory address, and (ii) forward the RDMA message to the root FPGA via the serial link between the root FPGA and the first worker FPGA;
wherein the root FPGA comprises a transmit interface to send the RDMA message to the network interface controller of the computing device via an I/O link; and
the network interface controller comprises an RDMA manager to send the RDMA message to a remote host.

19. The computing device of claim 18, wherein the memory address is included in a unified address space, and wherein the memory address is included in a part of the unified address space that is associated with the first worker FPGA.

20. The computing device of claim 19, wherein to generate the RDMA message comprises to read data from a memory coupled to the first worker FPGA at a memory location associated with the memory address.

21. The computing device of claim 18, wherein to forward the RDMA message to the root FPGA via the serial link comprises to forward the RDMA message via a memory access protocol.

22. One or more non-transitory, computer-readable storage media comprising a plurality of instructions stored thereon that, in response to being executed, cause a computing device to:
generate, by a first worker field programmable-gate array (FPGA) of the computing device, an RDMA message, wherein the RDMA message comprises a memory address;
send, by the first worker FPGA, the RDMA message to a root FPGA of the computing device via a serial link between the root FPGA and the first worker FPGA, wherein the root FPGA is coupled to each of a plurality of worker FPGAs by a corresponding serial link;

forward, by the root FPGA, the RDMA message via an I/O link; and send the RDMA message to a remote host.

23. The one or more non-transitory, computer-readable storage media of claim 22, wherein the memory address is included in a unified address space, and wherein the memory address is included in a part of the unified address space that is associated with the first worker FPGA.

24. The one or more non-transitory, computer-readable storage media of claim 23, wherein to generate the RDMA message comprises to read data from a memory coupled to the first worker FPGA at a memory location associated with the memory address.

25. The one or more non-transitory, computer-readable storage media of claim 22, wherein to forward the RDMA message to the root FPGA via the serial link comprises to forward the RDMA message via a memory access protocol.

* * * * *